(12) United States Patent
Baerlocher

(10) Patent No.: US 12,271,924 B2
(45) Date of Patent: Apr. 8, 2025

(54) MULTI-ENTITY ENTERPRISE LOYALTY SYSTEM

(71) Applicant: IGT, Las Vegas, NV (US)

(72) Inventor: Anthony J. Baerlocher, Henderson, NV (US)

(73) Assignee: IGT, Las Vegas, NV (US)

(*) Notice: Subject to any disclaimer, the term of this patent is extended or adjusted under 35 U.S.C. 154(b) by 4 days.

(21) Appl. No.: 16/366,578

(22) Filed: Mar. 27, 2019

(65) Prior Publication Data

US 2020/0311759 A1 Oct. 1, 2020

(51) Int. Cl.
*G06Q 30/0226* (2023.01)
*G06Q 50/34* (2012.01)
*G07F 17/32* (2006.01)

(52) U.S. Cl.
CPC ......... *G06Q 30/0227* (2013.01); *G06Q 50/34* (2013.01); *G07F 17/3239* (2013.01); *G07F 17/3276* (2013.01)

(58) Field of Classification Search
None
See application file for complete search history.

(56) References Cited

U.S. PATENT DOCUMENTS

| | | | |
|---|---|---|---|
| 8,166,407 B2 | 4/2012 | Lee et al. | |
| 9,307,035 B1 | 4/2016 | Berentey et al. | |
| 9,542,812 B2 | 1/2017 | Guinn et al. | |
| 9,868,056 B2 | 1/2018 | Kehoe et al. | |
| 9,972,047 B1* | 5/2018 | Elliott | G06Q 30/0267 |
| 2002/0128952 A1 | 9/2002 | Melkomian et al. | |
| 2004/0193489 A1* | 9/2004 | Boyd | G06Q 30/0225 713/176 |
| 2008/0009344 A1 | 1/2008 | Graham et al. | |
| 2008/0207327 A1 | 8/2008 | Van Luchene et al. | |
| 2009/0089838 A1* | 4/2009 | Pino, Jr. | G06Q 30/02 725/40 |
| 2010/0023863 A1 | 1/2010 | Cohen-Martin | |
| 2012/0122553 A1* | 5/2012 | Bunch | G06Q 30/02 463/25 |
| 2012/0122561 A1 | 5/2012 | Hedrick et al. | |
| 2013/0097003 A1* | 4/2013 | Baerlocher | G06Q 30/02 705/14.27 |
| 2014/0156372 A1* | 6/2014 | Postrel | G06Q 30/0226 705/14.27 |
| 2015/0005059 A1 | 1/2015 | Johnson | |
| 2015/0178759 A1 | 6/2015 | Glasgow | |
| 2015/0227987 A1 | 8/2015 | Kumar et al. | |
| 2015/0262109 A1 | 9/2015 | Ainsworth, III et al. | |
| 2015/0287279 A1 | 10/2015 | Nichols | |
| 2016/0189197 A1* | 6/2016 | Kumar Goel | G06Q 30/0233 705/14.33 |

FOREIGN PATENT DOCUMENTS

EP 2745893 A2 * 6/2014 ............. A63F 13/00

* cited by examiner

*Primary Examiner* — Michael J Sittner
(74) *Attorney, Agent, or Firm* — Neal, Gerber & Eisenberg, LLP

(57) ABSTRACT

Systems and methods which offer a loyalty program affiliated with different entities associated with an enterprise.

19 Claims, 6 Drawing Sheets

| Player A - Quarterback | |
|---|---|
| User Identity | Points Allocated by User to Player A |
| User 1 | 15,778 |
| User 2 | 14,993 |
| User 3 | 14,879 |
| User 4 | 14,663 |
| User 5 | 13,926 |

202b

| Player B - Running Back | |
|---|---|
| User Identity | Points Allocated by User to Player B |
| User 6 | 12,445 |
| User 7 | 12,339 |
| User 8 | 11,878 |
| User 3 | 11,779 |
| User 9 | 11,596 |

202c

| Player C - Long Snapper | |
|---|---|
| User Identity | Points Allocated by User to Player C |
| User 10 | 453 |
| User 11 | 87 |
| | |
| | |
| | |

MULTI-ENTITY ENTERPRISE LOYALTY SYSTEM

BACKGROUND

Player tracking systems may enable gaming establishments to recognize the value of customer loyalty through identifying frequent customers and rewarding them for their patronage.

BRIEF SUMMARY

In certain embodiments, the present disclosure relates to a system including a processor, and a memory device that stores a plurality of instructions. When executed by the processor, the instructions cause the processor to, for each of a plurality of different entities affiliated with an enterprise, maintain a leaderboard associated with that entity. When executed by the processor responsive to an occurrence of a point accumulation event associated with a user, the instructions cause the processor to accumulate a quantity of points for that user, wherein when accumulated, the quantity of points are not assigned to any of the entities affiliated with the enterprise.

In certain embodiments, the present disclosure relates to a system including a processor a memory device that stores a plurality of instructions. When executed by the processor responsive to an occurrence of a point redemption event associated with a user, the instructions cause the processor to enable the user to assign a point to a first entity of a plurality of different entities affiliated with an enterprise, and modify a ranking of users associated with the first entity affiliated with the enterprise, the modification being based on the assignment of the point.

In certain embodiments, the present disclosure relates to a system including a processor, and a memory device that stores a plurality of instructions. When executed by the processor, the instructions cause the processor to, for each of a plurality of different entities affiliated with an enterprise, maintain a leaderboard of a plurality of users associated with that entity, the plurality of users being ranked based on an amount of points each of the users assigned to that entity. When executed by the processor responsive to a realized benefit event occurring in association with a first entity of the plurality of different entities, the instructions cause the processor to, for a first user of the plurality of users associated with the first entity, determine a benefit associated with the first user, and communicate data that results in a display device displaying the determined benefit associated with the first user.

Additional features are described herein, and will be apparent from the following Detailed Description and the figures.

BRIEF DESCRIPTION OF SEVERAL VIEWS OF THE DRAWINGS

FIG. 2 is a front view of a plurality of leaderboards of one embodiment of the system disclosed herein illustrating different quantities of earned points allocated by different users to different entities of the enterprise.

DETAILED DESCRIPTION

Multiple Entity Enterprise Loyalty Program

Figure 1:
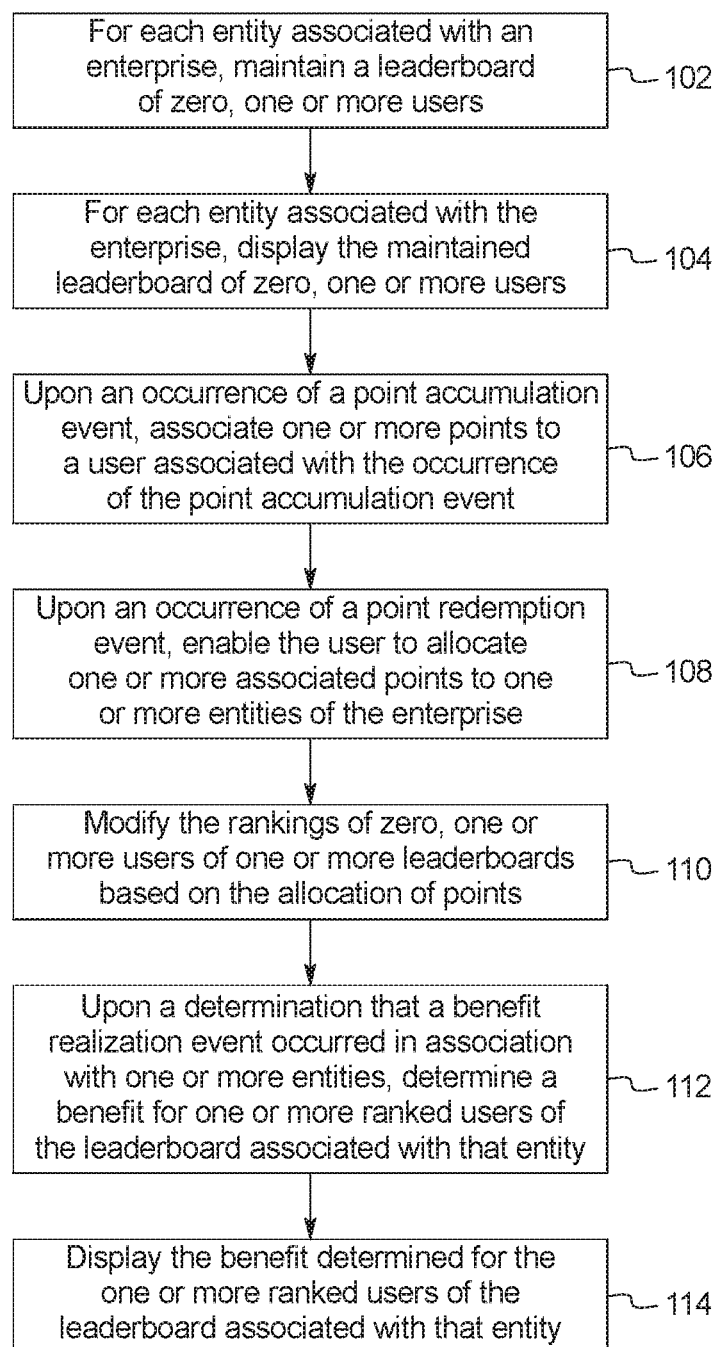
FIG. 1 is a flow chart an example process for operating a system which associates points with a user and enables the user to allocate points to different entities of an enterprise to potentially obtain one or more benefits.

In various embodiments, the present disclosure relates generally to systems and methods which offer a loyalty program affiliated with different entities associated with an enterprise.

In certain embodiments, the system enables a user to earn points, such as non-monetary loyalty points, for various activities undertaken which are affiliated with an enterprise associated with a plurality of different entities. In these embodiments, following a user earning points, the system enables the user to attribute those points to a specific entity of the enterprise. For each of the different entities, the system ranks the users whom have attributed one or more points to that entity, wherein such rankings are based, at least in part, on the quantity of points that user attributed to that entity. In association with these rankings for each entity of the enterprise, the system assigns certain or all the users (whom have attributes points to that specific entity) to a leaderboard. Certain benefits are accessible to certain of the users assigned to the leaderboards associated with the individual entities. Such a system which enables users to actively decide which entity of an enterprise to attribute earned points to increases the user's level of interaction with the enterprise and/or a specific entity of that enterprise. Moreover, such as system which publicizes which users have the highest rankings in association with different entities increases the user's engagement as such users not only experience the deserved recognition and accomplishment of being ranked on a leaderboard associated with an entity but such users remain engaged to maintain such an esteemed ranking.

In various embodiments, the system includes a plurality of different ways to earn points (which the user may then attribute to one or more entities). In one such embodiment, a user earns points by undertaking one or more activities associated with the purchase of goods and/or services associated with the enterprise or an entity of the enterprise. For example, if the enterprise is a professional sports team, the system enables a user to earn points for purchasing tickets to a venue and/or concessions at the venue. In another such embodiment, a user earns points by undertaking one or more activities associated with the enterprise but separate from any purchasing activity associated with the enterprise or an entity of the enterprise. For example, if the enterprise is a professional sports team, the system enables a user to earn points for attending events associated with that team (e.g., going to training camp) or partaking in social media activity associated with that team (e.g., following and/or posting about the team on social media). In another such embodiment, a user earns points by undertaking one or more activities independent of the enterprise or an entity of the enterprise. For example, if the enterprise is a professional sports team, the system enables a user to wager an amount of points on a play of a game of chance (which is independent of the sports team) with the goal of winning even more points.

In various embodiments, the system includes a plurality of different ways to redeem points in association with the different entities of the enterprise. That is, the system maintains various different entities to which a user allocates or attributes earned points to (in hopes of obtaining a higher ranking and the associated benefits that come with). For example, if the enterprise is a professional sports team, the system maintains specific players and coaches of a team as the different entities which points may be attributed to by the user. In these embodiments, each entity is associated with an individual, tiered leaderboard and for each entity, the users that attributed points to that entity are ranked based on such user's attributed points.

In certain embodiments, the system includes that different benefits associated with the different entities of the enterprise are available to different users based on their respective status on the leaderboard associated with that entity. In these embodiments, since different entities of the enterprise are associated with different benefits, a user's decision to attribute points to one entity over another entity affects the benefits potentially available to that user. In one such embodiment, the benefit includes access to information and/or timing of distribution of information associated with that entity and/or the enterprise as a whole. In another such embodiment, the benefit includes access to a personal experience with that specific entity.

It should be appreciated that in these embodiments, since certain entities of the enterprise may be more popular than other entities, the system employs a degree of strategy in a user's decision to attribute points to one entity over another. For example, continuing with the example above wherein the enterprise is a professional sports team, attributing points to a team's punter (i.e., a first entity of the enterprise) may result in a more substantial move in the user's ranking than attributing points to a team's quarterback (i.e., a second entity of the enterprise). In this example, in deciding which entity to attribute an amount of points to, the user must weigh an entity's relative popularity, an amount of points previously attributed to that entity (by that user as well as others) and the different benefits associated with the different entities.

Such a system thus provides users with a more personalized experience (i.e., users can select which entity they want their points attributed to and advertisements can be targeted based on this selection) and keeps the users engaging the enterprise to earn points when the user otherwise would not (i.e., if a user earns multiplied points for following a team during the off season, that user may stay connected to the team when they otherwise would switch their attention to an in-season sports team).

FIG. 1 is a flowchart of an example process or method of operating the system of the present disclosure. In various embodiments, the process is represented by a set of instructions stored in one or more memories and executed by one or more processors. Although the process is described with reference to the flowchart shown in FIG. 1, many other processes of performing the acts associated with this illustrated process may be employed. For example, the order of certain of the illustrated blocks or diamonds may be changed, certain of the illustrated blocks or diamonds may be optional, or certain of the illustrated blocks or diamonds may not be employed.

In various embodiments, for each entity associated with an enterprise, the system maintains and displays a leaderboard of zero, one or more users as indicated in blocks 102 and 104. In these embodiments, the enterprise includes or is otherwise associated with a plurality of individual entities which are each associated with an individual leaderboard including zero, one or more ranked users. That is, for each of a plurality of individual entities of the enterprise, the system ranks the different users, based on points allocated to that entity by the user, and causes one or more display devices to display, via a leaderboard, a designated quantity of such ranked users. More specifically, for each entity of the enterprise, the system maintains a leaderboard including a quantity of ranked positions which correspond to a relative order that different users participating in the enterprise loyalty program are ranked according to one or more criteria at different points in time. As such, as the respective rankings for different users may change throughout each users participation in the enterprise loyalty program, the system utilizes the leaderboards to dynamically convey the users that are currently ranked (i.e., at that point in time) at the ranked positions that qualify for display on the leaderboards.

In certain embodiments, for each user that qualifies for display on the leaderboard associated with an entity of the enterprise, the system displays additional user-related information, such as a quantity of points allocated by that user to the entity associated with the leaderboard. In certain embodiments, for one or more maintained leaderboards, the system causes that leaderboard to display additional or alternative information, such as the amount of time that the user has been ranked and displayed on that leaderboard at their current ranking position, and/or the amount of time that the user has been ranked and displayed on that leaderboard at any ranking position of the leaderboard.

In certain embodiments, the enterprise includes a public enterprise associated with a plurality of public or known entities. In these embodiments, the system maintains a leaderboard for certain of/each of the different known people or entities affiliated with that enterprise. For example, as part of a loyalty program associated with a known band (i.e., the enterprise), the system maintains an individual leaderboard in association with each of the members of that band (i.e., the known entities of the enterprise), such as the system maintaining one leaderboard for the lead singer of the band, another leaderboard for the drummer of the band, and another leaderboard for the guitarist of the band. It should be appreciated that known people include, but are not limited to, actors, musicians, athletes, authors, reality show participants, entertainment personalities, bloggers, professional game players, politicians, and other people in the public domain.

In certain embodiments wherein the enterprise employed is a public or known enterprise, one or more of the entities which the system maintains individual leaderboards for are known people. For example, as seen in FIG. 2, for a professional football team (i.e., the enterprise), the system maintains an individual leaderboard 202a to 202c for each of a group of the players 204a to 204c (i.e., the entities) of that professional football team. As seen in this example, the system maintains, for each leaderboard maintained for each player, a ranking of zero, one or more users 206a to 206k whom have allocated one or more points to that player as described herein. As seen in this example, one or more users (e.g., user 3 206c) may be simultaneously ranked on one or more leaderboards associated with one or more entities of the enterprise. As also seen in this example, while a leaderboard associated with an entity of the enterprise includes a quantity of ranked positions for different users, certain of such ranked positions may remain open or unoccupied (e.g., the three open ranked positions of leaderboard C for Player C 204c) if not enough users have allocated points to that entity.

It should be appreciated that while this example includes individual leaderboards for each of a group of players of the football team, the system additionally or alternatively maintains an individual leaderboard in association with one or more coaches, cheerleaders, front office executives as well as one or more groups of individuals, such as the team's offense, the team's defense, and the team's coaching staff (i.e., the entities). It should be further appreciated that while this example includes three leaderboards of up to five ranked users for three different players on the team, any suitable number of leaderboards of up to any suitable number of ranked users for any suitable number of players on the team (i.e., any number of leaderboards for any number of entities of the enterprise) may be employed in association with the present disclosure.

In certain embodiments, the enterprise includes a known enterprise associated with a plurality of private entities. In these embodiments, the system maintains a leaderboard for certain of/each of the different private individuals or entities affiliated with that public enterprise. For example, as part of a company's employee retention process, the system maintains an individual leaderboard in association with certain of/each of the employees of that company (i.e., the private entities of the enterprise). In another example, as part of a company's internal department competition to accomplish one or more goals, the system maintains an individual leaderboard in association with certain of/each of the different departments of that company (i.e., the private entities of the enterprise), such as the system maintaining one leaderboard for the accounting department of Company X, another leaderboard for the human resources department of Company X, and another leaderboard for the legal department of Company X.

In certain embodiments, the enterprise includes a private enterprise associated with a plurality of private entities. In these embodiments, the system maintains a leaderboard for certain of/each of the different private individuals or entities affiliated with that private enterprise. For example, as part of a group or family's vacation to a resort, a resort guest system maintains an individual leaderboard in association with certain of/each of the members of that family (i.e., the private entities of the enterprise).

It should be appreciated that any living or non-living person, any place and/or anything which are part of or otherwise associated with one or more enterprises may qualify as an entity which the system maintains one or more leaderboards for. That is, while certain entities of the present disclosure include known people (e.g., celebrities) and/or unknown people (e.g., private citizens), other entities of the present disclosure include locations, groups of people, and/or objects. For example, as part of promoting an upcoming movie (i.e., the enterprise), the system maintains individual leaderboards for each of the actors/actresses (i.e., individual entities), the setting location of the movie (i.e., an individual entity), the location of the filming of the movie (i.e., an individual entity), and a prop featured in the movie (i.e., an individual entity).

In addition to maintaining individual leaderboards in association with the individual entities of an enterprise, in various embodiments, as illustrated in block 106 of FIG. 1, upon an occurrence of a point accumulation event, the system associates one or more points to a user associated with the occurrence of the point accumulation event. That is, upon a determination that a user has earned one or more points based on one or more activities (or inactivities) of the user, the system associates such points with the user to allocate to one or more entities as described herein. In these embodiments, when one or more points are initially associated with a user upon an occurrence of a point accumulation event, such points are not yet associated with or otherwise allocated to any of the entities of the enterprise.

It should be appreciated that the points employed in association with the enterprise (i.e., enterprise points) are different from any monetary currency, any retail program reward points or any gaming establishment currency, such as monetary credits, promotional credits and player tracking points. It should be further appreciated that, in various embodiments, while the points employed in association with the enterprise are not redeemable for any monetary currency, any retail program reward points or any gaming establishment currency, such monetary currency, retail program reward points and/or gaming establishment currency may be exchanged by a user to obtain (or for a chance to obtain) such points employed in association with the enterprise.

In one embodiment, the system determines that a point accumulation event occurs when a user takes one or more actions associated with one or more entities of the enterprise.

In one such embodiment, a point accumulation event occurs when a user has made a qualifying purchase of goods and/or services (i.e., a qualifying retail spend). In this embodiment, upon the system determining that a user has purchased goods and/or services from an entity of the enterprise and/or an affiliated retailer associated with the enterprise, the system determines a quantity of points for the user. For example, if the enterprise is a professional sports team, upon the system determining that a user has purchased tickets to an upcoming game, purchased concessions at the sports team's stadium during a game and/or purchases a jersey of a player, the system associates a quantity of points with the user.

In another such embodiment, a point accumulation event occurs when a user purchases one or more points. In this embodiment, upon the system determining that a user has purchased a quantity of points associated with the enterprise, the system associates such purchased points with the user. For example, if the enterprise is a professional sports team, upon the system determining that a user has purchased one-hundred points for that sports team, the system associates the purchased points with the user.

In another such embodiment, a point accumulation event occurs when a user has attended one or more events associated with the enterprise. In this embodiment, upon the system determining that a user has attended a qualifying event sponsored by or otherwise associated with the enterprise and/or an affiliated party associated with the enterprise, the system determines a quantity of points for the user. For example, if the enterprise is a professional sports team, upon the system determining that a user has attended a training camp session and/or attended a team convention, the system associates a quantity of points with the user.

In another such embodiment, a point accumulation event occurs when a user undertakes in one or more social media activities associated with the enterprise. In this embodiment, upon the system determining that a user has generated social media content associated with the enterprise and/or an affiliated party associated with the enterprise, the system determines a quantity of points for the user. For example, if the enterprise is a professional sports team, upon the system determining that a user has followed and/or positively posted about the professional sports team (i.e., the enterprise) and/or one or more players of the professional sports team (i.e., the individual entities), the system associates a quantity of points with the user.

In certain embodiments, the social media content includes one or more social media content components in one or more media formats. In such embodiments, the social media content components includes one or more of: still images (e.g., a picture of a user attending a sporting event) video clips (e.g., a video recording of the user at the sporting event), sound clips (e.g., a user's verbal reaction at the sporting event), audio-video clips, text (e.g., an advertisement promoting an upcoming sporting event of the sports team), transaction information (e.g., an amount spent purchasing goods at the sporting event), location information, application usage information, event attendance information, and/or biometric information. In different embodiments, the social media content components are combinable with contextual information, such as information about the user, place and time, and then formatted to generate the social media content. In these embodiments, the generated social media content is uploaded to a social media site such that the social media content derived from activities of a user which are associated with the enterprise can be posted to an account at a social media site (e.g., Facebook™, Google+™ Twitter™, Instagram™, LinkedIn™ Snapchat™, YouTube™, Pinterest™, Tumblr™, Flickr™, Reddit™, Quora™, Vine™ and/or Periscope™).

In certain embodiments, the social media content includes embedded tracking information, such as user identification information and/or location information. In these embodiments, the tracking information, which may be part of the displayed portion of the social media content (e.g., the displayed user's name) and/or part of a non-displayed portion of the social media content, is utilized to track subsequent interactions that one or more other users have with the social media content. In such embodiments, by associating a user's social media username with the embedded user identification information, the system disclosed herein is operable to query the various social media services for each user to learn about that user's social media activity. In an additional or alternative embodiment, by associating a user's social media username with the embedded user identification information, the system disclosed herein is operable to instruct the various social media services to notify the system when social media activity associated with the user occurs for internal tracking and potential point determinations as described herein. In an additional or alternative embodiment, by associating a user's social media username with the embedded user identification information, the system disclosed herein is operable to query the social media service for when certain social media activity associated with the user occurs for internal tracking and potential point determinations as described herein.

It should be appreciated that while described as a user earning points for posting (or otherwise authorizing one or more components of the system to post) social media content to one or more social media networks, any suitable sharing of social media content (associated with the enterprise and/or an entity of the enterprise) to one or more other people qualifies as an occurrence of a point accumulation event. That is, while posting to a social media network, such as Facebook™ or Twitter™ are one form of earning points, reviewing one or more aspects of an enterprise, such as reviewing the food at a venue associated with the enterprise on one or more peer review sites, such as Yelp™ are another form of earning one or more points upon a point accumulation event. In another embodiment, a point accumulation event occurs upon sending information to one or more other people regarding the enterprise and/or an individual entity of the enterprise, such as via an e-mail, SMS or text message, a push notification sent to a mobile device, and/or a website posting.

In another embodiment, a point accumulation event occurs when a user undertakes an activity associated with the enterprise and/or one or more individual entities of the enterprise. In this embodiment, upon the system determining that a user has taken one or more actions related to the enterprise, an entity of the enterprise and/or an affiliated party associated with the enterprise, the system determines a quantity of points for the user. For example, if the enterprise is a professional football team, upon the system determining that a user has drafted a player of the football team to the user's fantasy football team and/or inserted the football player into the user's fantasy football lineup, the system associates a quantity of points with the user.

In another embodiment, a point accumulation event occurs when a user reaches a milestone associated with the enterprise and/or one or more individual entities of the enterprise. In this embodiment, upon the system determining that a user has qualified for a quantity of points based on the user's current status or historic status related to the enterprise, an entity of the enterprise and/or an affiliated party associated with the enterprise, the system determines a quantity of points for the user. In different embodiments, a user obtains such milestones based on time, one or more actions of the user and/or one or more inactions of the user. For example, if the enterprise is an employee's company, upon the system determining that it is the user's birthday or the user's work anniversary, the system associates a quantity of points with the user. In another example, if the enterprise is a professional football team, upon the day of a game and/or the day of the team's draft, the system associates a quantity of points with the user.

In another embodiment, a point accumulation event occurs based on one or more locations visited by a user. In this embodiment, upon the system determining that a user has qualified for a quantity of points based on the user visiting (or not visiting) one or more locations associated with the enterprise, an entity of the enterprise and/or an affiliated party associated with the enterprise, the system determines a quantity of points for the user. For example, if the enterprise is band, upon the system determining, based on applicable location-tracking mechanisms, such as GPS, that a user has entered a venue where the band is performing a show within a designated amount of time, the system associates a quantity of points with the user.

In another embodiment, a point accumulation event occurs when the system determines that a user has accessed one or more interfaces of the system. In one such embodiment, upon the system determining that a user has accessed the system via a web browser, the system determines a quantity of points for the user. In another such embodiment, upon the system determining that a user has accessed the system via a mobile device application of a mobile device, the system determines a quantity of points for the user.

In another embodiment, a point accumulation event occurs in association with one or more games played by the user at any suitable device, such as a mobile device, a kiosk (including, but not limited to a sports betting kiosk), a sports betting terminal, a video lottery terminal, an electronic gaming machine and/or a gaming terminal associated with a gaming table. In one such embodiment, the system enables a user to wager a non-point currency, such as monetary credits, to play a game wherein the award for the play of the game is in the form of points. In this embodiment, the user plays a game of chance (or a game of skill) with the hope of turning an amount of non-point currency into an amount of points. In another such embodiment, the system enables a user to wager an amount of points to play a game wherein the award for the play of the game is in the form of points. In this embodiment, the user plays a game of chance (or a game of skill) with the hope of turning a first amount of points into a second, greater amount of points. It should be appreciated that in these embodiments, a play of any suitable game includes, but not limited to: a play of any suitable slot game; a play of any suitable wheel game; a play of any suitable card game; a play of any suitable offer and acceptance game; a play of any suitable award ladder game; a play of any suitable puzzle-type game; a play of any suitable persistence game; a play of any suitable selection game; a play of any suitable cascading symbols game; a play of any suitable ways to win game; a play of any suitable scatter pay game; a play of any suitable coin-pusher game; a play of any suitable elimination game; a play of any suitable stacked wilds game; a play of any suitable trail game; a play of any suitable bingo game; a play of any suitable video scratch-off game; a play of any suitable pick-until-complete game; a play of any suitable shooting simulation game; a play of any suitable racing game; a play of any suitable promotional game; a play of any suitable high-low game; a play of any suitable lottery game; a play of any suitable number selection game; a play of any suitable dice game; a play of any suitable skill game; a play of any suitable auction game; a play of any suitable reverse-auction game; a play of any suitable group game; a play of any suitable game in a service window; and/or a play of any suitable game on a mobile device.

In certain embodiments wherein a point accumulation event occurs in association with one or more games played by the user, the system determines if a point accumulation event occurs based on the accumulation of a designated quantity of traceable elements associated with the one or more games played. In these embodiments, the system tracks each occurrence of a traceable element and upon the quantity of tracked elements reaching or exceeding a designated threshold quantity, the system causes a point accumulation event to occur and associates one or more points with the user. In different embodiments, the traceable elements include, but are not limited to: a deposit of an amount of funds; an identification of a user (or a designated user); any user (or a designated user) placing a wager (regardless of the wager amount); any user (or a designated user) placing a side-wager (regardless of the side-wager amount); any user (or a designated user) wagering on a number of paylines; any user (or a designated user) wagering on a designated payline; any user (or a designated user) wagering on a number of ways to win; any user (or a designated user) engaging an input device of the gaming device to cause a generation of an outcome; an activation of a reel (or a designated reel): an activation of a plurality of reels; a generation of any outcome (or a designated outcome); a generation of any outcome (or a designated outcome) associated with an award; a generation of any outcome (or a designated outcome) associated with an award over a designated value; a generation of an outcome (or a designated outcome) on a designated payline; a generation of an outcome (or a designated outcome) in a scatter configuration; a generation of a winning way to win (or a designated winning way to win): a generation of a designated symbol or symbol combination; a generation of a designated symbol or symbol combination on a designated payline; a generation of a designated symbol or symbol combination in a scatter configuration; a triggering of a play of a secondary game; an activation of a secondary display; an activation of a community award generator; a generation of any outcome (or a designated outcome) in a secondary game; any user (or a designated user) engaging an input device of the gaming device to make a selection in a game; an amount of free spins provided; an amount of time elapsed; any event disclosed herein which is tracked for a group of electronic gaming machines; any event disclosed herein which includes a group of electronic gaming machines working together for each occurrence of such tracked event; any event disclosed herein which is tracked for a group of users; any event disclosed herein which includes a group of users working together for each occurrence of such tracked event; and/or any suitable event which occurs in association with a user's gaming experience.

In another embodiment wherein the system is employed in association with a gaming establishment, a point accumulation event occurs in association with any suitable event occurring at a gaming establishment. In certain embodiments, the point accumulation event occurs based on any gaming event associated with the gaming establishment, such as a play of a game (as described above), a placement of a sports bet, and/or a participation in a tournament. In certain embodiments, the point accumulation event occurs based on any suitable non-gaming experience at a gaming establishment. In different embodiments, such events include, but are not limited to: a user visiting one or more locations of a gaming establishment, a user making one or more purchases at one or more retail locations of a gaming establishment, a user making one or more designated purchases at one or more retail locations of a gaming establishment, a user attending one or more events at a gaming establishment, a user utilizing one or more gaming establishment services, a user attending a club and/or show associated with a gaming establishment, a user taking a picture associated with the gaming establishment (e.g., a user taking a skyline picture that includes the gaming establishment), a user observing one or more other people, such as a user taking a picture of a celebrity or a uniquely dressed person at a gaming establishment, and/or a user observing the activity of other people, such as a user taking a picture of another patron winning a progressive award.

In another embodiment, a point accumulation event occurs when the system determines that a user has failed to take any action associated with the enterprise for a designated period of time. In this embodiment, upon the system determining that a user has not been involved in any point generating events for a certain amount of time, the system determines a quantity of points for the user (as a way to spark the user's interest in the enterprise loyalty program disclosed herein). For example, if the enterprise is a professional sports team, upon the system determining that a user has not accessed the team's website for six months, the system associates a quantity of points with the user in an effort to try and drive the user back to the team's website.

It should be appreciated that any suitable event, series of events or lack of an event may qualify as an occurrence of a point accumulation event as disclosed herein. That is, the system of the present disclosure is operable to provide zero, one or more points to a user based on any suitable action undertaken by the user or inaction not taken by the user which is directly or indirectly associated with the enterprise (which the enterprise loyalty program disclosed herein is the subject of) and/or any individual entities of the enterprise.

In certain embodiments, upon an occurrence of a point accumulation event, the system determines a static amount of points to associate with the user. In one such embodiment, different events which qualify as a point accumulation event are associated with different static amounts of points. For example, a user logging into a professional sports team's website qualifies as a point accumulation event associated with a first quantity of points and the user attending a team convention for that professional sports team qualifies as a point accumulation event associated with a second, greater quantity of points.

In certain embodiments, upon an occurrence of a point accumulation event, the system determines a variable amount of points to associate with the user. In one such embodiment, different events which qualify as a point accumulation event are associated with different variable amounts of points. For example, a user making a purchase of a good via a professional sports team's website qualifies as a point accumulation event associated with a first quantity of points of a first percentage of the purchase price and the user purchasing season tickets to the games of that professional sports team qualifies as a point accumulation event associated with a second, greater quantity of points of a second, greater percentage of the purchase prize.

In certain embodiments, the system provides each of the users the same amount of points for the same activity. In certain embodiments, the system provides different users different amounts of points for the same activity. In one such embodiment, the system determines the amount of points to provide to a user based on that user's relative ranking on one or more leaderboards associated with one or more entities of the enterprise. For example, users ranked in the top ten users for a particular leaderboard (or any leaderboard) receive a multiplier of any points earns for any activities. This example provides a further incentive for a user to obtain and maintain a designated ranking on a leaderboard.

In addition to associating one or more points with a user associated with an occurrence of a point accumulation event, upon an occurrence of a point redemption event, the system enables the user to allocate one or more associated points to one or more entities of the enterprise as indicated in block 108 of FIG. 1. That is, in addition to enabling a user to accumulate points, the system enables a user to assign such accumulated points to one or more entities of the user's choosing.

In certain embodiments, a point redemption event occurs responsive to a user's input to redeem a quantity of accumulated points. For example, upon a user accessing a mobile device application of a mobile device to redeem one or more accumulated points, the system determines that a point redemption event occurred and enables the user to allocate one or more associated points to one or more entities of the enterprise. It should be appreciated that in these embodiments, since the allocation of points to an entity occurs responsive to a user's input, the point redemption event selectively occurs whenever the user wants to utilize their associated points. As such, this embodiment includes an element of strategy or skill as a user must decide when to allocate one or more associated points to one or more entities and when to hold off on such an allocation (presumably for a more favorable scenario to allocate such points).

In certain embodiments, a point redemption event occurs based on if at least one redemption condition is satisfied and following a user's input to redeem a quantity of accumulated points. In these embodiments, prior to enabling a user to redeem any associated points, the system first determines if one or more redemption conditions are satisfied, such as whether or not the user has maintained an eligible status to redeem points. If the redemption condition is satisfied, the system enables the user to allocate one or more associated points to one or more entities of the enterprise. On the other hand, if the redemption condition is not satisfied, the system awaits for the satisfaction of the redemption condition before enabling the user to allocate any associated points to any entities of the enterprise.

In certain embodiments, a point redemption event automatically occurs at designated intervals, such as at a designated point in time, during a designated period of time and/or upon the user accumulating a designated amount of points. In these embodiments, upon the automatic occurrence of the point redemption event, the system enables the user to allocate one or more associated points to one or more entities of the enterprise. It should be appreciated that in these embodiments, since the point redemption event automatically occurs, the system requires the user to allocate some (or all) of their associated points to one or more entities of the enterprise. In certain embodiments, accumulated points expire after a designated amount of time such that a point redemption event occurs prior to the expiration of such points.

In certain embodiments, upon an occurrence of a point redemption event, the system enables the user to select a single entity to allocate the user's obtained points to. In these embodiments, the allocation of points to an entity upon an occurrence of a point redemption event is an all-or-none event for each of the individual entities. In certain other embodiments, upon an occurrence of a point redemption event, the system enables the user to select multiple entities to allocate the user's obtained points to. In these embodiments, the system enables a user to spread out their points amongst multiple entities and allocate different amounts (or the same amount) of points to a plurality of different entities.

It should be appreciated that since the system maintains an individual leaderboard for each of the individual entities of the enterprise and since upon an occurrence of a point redemption event, the system enables the user the allocate one or more points to any of the individual entities of the enterprise, the system employs a degree of strategy in a user's decision to attribute points to one entity over another. That is, as certain entities of the enterprise may be more popular than other entities (and thus a user's allocation of points to a popular entity may have less of an effect on moving that user up the leaderboard for that popular entity), when deciding to allocate points to an individual entity, the user may consider the magnitude of how such allocated points will affect the user's ranking on one leaderboard associated with one entity versus another leaderboard associated with another entity. For example, as seen in FIG. 2, upon an occurrence of a point redemption event, if User 3 has obtained five-hundred points to allocate to a single entity, that user must decide whether to allocate these five-hundred points to: (i) a popular entity of the team's quarterback (which would result in User 3 moving from the third ranked position to the second ranked position on that leaderboard), (ii) another popular entity of the team's running back (which would result in User 3 moving from the fourth ranked position to the third ranked position on that leaderboard), or (iii) an unpopular entity of the team's long snapper (which would result in User 3 moving from not being at any ranked position to the top ranked position on that leaderboard). In this example, in deciding which entity to attribute an amount of points to, the user must weigh an entity's relative popularity, an amount of points previously attributed to that entity (by that user as well as others) and the different benefits associated with the different entities.

In certain embodiments, following the allocation of an amount of points to an entity, the system employs the entity (or enterprise) to acknowledge the allocation of points to that entity. In these embodiments, for a first amount of allocated points, the enterprise or individual entity automatically acknowledges the allocation of points from a user by any suitable system component (e.g., an overhead display), any suitable mobile device application associated with the enterprise, telephone, e-mail, SMS or text messages, additional social media postings and/or any other suitable medium. In these embodiment, for a second, greater amount of allocated points, the individual entity personally acknowledges, if applicable, the allocation of points from a user by calling, texting or otherwise contacting the user.

Following the user's allocation of an amount of points to one or more entities of the enterprise, the system modifies the rankings of zero, one or more users of one or more leaderboards based on the allocation of points as indicated in block 110. In certain embodiments, since different users are allocating points to different entities at different points in time, the system updates the rankings of users of such leaderboards dynamically. That is, the system tracks the rankings of the different users during a constantly or consistently moving time period. For example, at designated intervals, such as every second, every ten seconds, every thirty seconds or at any other suitable number of time units, the system recalibrates zero, one or more leaderboards to determine which users are ranked, based on point allocations, at which positions of such leaderboards.

It should be appreciated that in certain embodiments, once a point has been allocated to a particular entity of the enterprise, that point may not be reallocated to another entity of the enterprise. That is, while an unallocated point may be allocated or assigned to any of the entities of the enterprise, an allocated point is non-transferable and remains allocated with a particular entity until removed by the system or that point otherwise expires. In certain other embodiments, certain points for certain users, such as a percentage of points for certain designated or high status users, may be transferred from one entity to another entity.

In addition to associating points with users and enabling such users to strategically allocate such points to different entities of the enterprise, upon a determination that a benefit realization event occurred in association with one or more entities, the system determines and displays a benefit for one or more ranked users of the leaderboard associated with that entity as indicated in blocks 112 and 114 of FIG. 1. In various embodiment, the system notifies the user of the determined benefit via any suitable system component (e.g., an overhead display), any suitable mobile device application associated with the enterprise, telephone, e-mail, SMS or text messages, additional social media postings and/or any other suitable medium.

In certain embodiments, different entities are associated with different benefits wherein the determination of the benefit is based on which entity the benefit realization event occurred in association with. In these embodiments, the different benefits available to users whom qualify for the leaderboards of such different entities factor into which entity a user may or may not allocate one or more points to. For example, as the benefit associated with being the top ranked user on the leaderboard associated with a team's quarterback may be more valuable than the benefit associated with being the top ranked user on the leaderboard associated with a team's long snapper, users may allocate more points to the team's quarterback thus making that entity even more popular. In certain embodiment, different entities are associated with the same benefit.

In certain additional or alternative embodiments, different periods of time since the last benefit realization event occurred are associated with different benefits. In these embodiments, the benefits are scaled based on time wherein different periods of time are associated with different benefits for the same leaderboard ranking. For example, the longer the amount of time since benefits were provided to one or more ranked users of a leaderboard associated with a particular entity, the greater the amount of the benefit provided to such ranked users.

In certain embodiments, the determination of the benefit is additionally or alternatively based on the identity of the user. In one such embodiment, different users having different status are offered different benefits. For example, a user whom is part of a team's VIP club is provided a greater benefit (for being ranked at a certain position on a leaderboard) than another user not part of the team's VIP club (whom is ranked at the same position on the leaderboard).

In certain embodiments, the determination of the benefit is additionally or alternatively based on one or more parameters of the enterprise, such as when the benefit is determined, and whether the enterprise prefers benefits provided in one form or another.

In certain embodiments, the determined benefit includes access to information and/or media content associated with a particular entity. That is, one determined benefit potentially available for allocating points to a particular entity includes the access to non-public media content about that entity. In one example, the system provides that the top ten ranked users on a leaderboard associated with a particular baseball player receive social media updates about that player while users ranked outside the top ten on the leaderboard receive the same social media updates at a later point in time, such as fifteen minutes later. In another example, the system provides that each of the ranked users of one tier of a leaderboard associated with a particular member of a band receive a download of a new song by that band prior to the public release of the new song.

In certain embodiments, the determined benefit includes access to a particular entity. That is, one determined benefit potentially available for allocating points to a particular entity includes access to interact with that entity. In one example, the system provides that the top ranked user on a leaderboard associated with a particular professional hockey player (i.e., the entity of the enterprise) may meet that player prior to a game. In another example, the system provides that the top 1% of ranked users on a leaderboard associated with a particular actor may accompany that actor (i.e., the entity) to the premier of a movie (i.e., the enterprise) which the actor is currently starring in.

In certain embodiments, the determined benefit includes access to non-public areas associated with the enterprise. That is, one determined benefit potentially available for allocating points to a particular entity includes the ability to access certain areas which the user would not otherwise be permitted to access. In one example, the system provides that the top one-hundred ranked users on a leaderboard associated with a stadium where a college football team plays are provided access to a VIP section of the stadium. In another example, the system provides that the top five ranked users on a leaderboard associated with a movie (i.e., the entity) of a movie studio (i.e., the enterprise) are provided access to visit the set of that movie.

In certain embodiments, the determined benefit includes a monetary award. In one such embodiment, the amount of the monetary award is based on the entity's leaderboard which the benefit realization event occurred in association with, wherein different entity's leaderboards are associated with different monetary awards. In another such embodiment, the amount of the monetary award is additionally or alternatively based on an identification of the user, such as based on a status of the user, wherein different player tracking statues are associated with different monetary awards for the same or similar leaderboard ranking.

In certain embodiments, the determined benefit includes one or more plays of a game of chance (and/or a game of skill). In one such embodiment, a quantity of plays of a game of chance (and/or game of skill) is based on the entity's leaderboard which the benefit realization event occurred in association with, wherein different entity's leaderboards are associated with different quantities of plays of the game of chance (and/or game of skill). In another such embodiment, the quantity of plays of a game of chance (and/or game of skill) is additionally or alternatively based on an identification of the user, such as based on a status of the user, wherein different user statuses are associated with different quantities of plays of a game of chance (and/or a game of skill) for the same or similar leaderboard ranking. In certain embodiments, the determined benefit includes one or more free (or reduced cost) plays of one or more games of chance (and/or games of skill) the next time the user visits a gaming establishment. In certain other embodiments, the determined benefit includes one or more free (or reduced cost) plays of one or more online games of chance (and/or games of skill) accessible remote from a gaming establishment. In these embodiments, such games include, but are not limited to: a play of any suitable slot game; a play of any suitable wheel game; a play of any suitable card game; a play of any suitable offer and acceptance game; a play of any suitable award ladder game; a play of any suitable puzzle-type game; a play of any suitable persistence game; a play of any suitable selection game; a play of any suitable cascading symbols game; a play of any suitable ways to win game; a play of any suitable scatter pay game; a play of any suitable coin-pusher game; a play of any suitable elimination game; a play of any suitable stacked wilds game; a play of any suitable trail game; a play of any suitable bingo game; a play of any suitable video scratch-off game; a play of any suitable pick-until-complete game; a play of any suitable shooting simulation game; a play of any suitable racing game; a play of any suitable promotional game; a play of any suitable high-low game; a play of any suitable lottery game; a play of any suitable number selection game; a play of any suitable dice game; a play of any suitable skill game; a play of any suitable auction game; a play of any suitable reverse-auction game; a play of any suitable group game; a play of any suitable game in a service window; a play of any suitable game on a mobile device; and/or a play of any suitable game disclosed herein.

In certain embodiments, the determined benefit includes an entry in a drawing, such as an entry to win a progressive award. In one such embodiment, a quantity of entries in the drawing is based on the entity's leaderboard which the benefit realization event occurred in association with, wherein different entity's leaderboards are associated with different quantities of drawing entries. In another such embodiment, the quantity of entries into a drawing is additionally or alternatively based on an identification of the user, such as based on a status of the user, wherein different statuses are associated with different quantities of entries in the drawing for the same or similar leaderboard ranking.

It should be appreciated that in these embodiments, since one or more entries into one or more drawings and one or more plays of one or more games of chance (and/or games of skill) may or may not result in an award for the user, such benefits are opportunities to obtain one or more benefits in association with allocated points to an entity. That is, while such benefits have an average expected value (i.e., a theoretical value which is based on the awards available and the probability of obtaining any of such awards), since one or more random determinations subsequently occur in association with the determined benefit and an actual value of the determined benefit (i.e., the benefit associated with the determined benefit) is based on the results of such random determinations (wherein the actual value may be a lucrative value or a value of zero), these determined benefits may be viewed as opportunities to obtain a benefit.

In certain embodiments, the determined benefit includes a conditional award that the user becomes eligible for based on the satisfaction of one or more criteria. That is, the system determines if the criteria associated with the conditional award is satisfied and the conditional award vests (i.e., the award becomes available to the user). It should be appreciated that any suitable criteria associated with the gaming establishment, associated with an entity having a relationship with the gaming establishment or independent of the gaming establishment may be utilized to determine whether or not the user satisfies such criteria and thus becomes eligible to win the conditional award.

In certain embodiments, the determined benefit includes a quantity of points. In these embodiments, to entice a user to allocate one or more points to an entity, the system determines a benefit of an additional quantity of points. In various embodiments, the determined benefit is based on the entity's leaderboard which the benefit realization event occurred in association with, wherein different entity's leaderboards are associated with different quantities of available points.

In certain embodiments, the determined benefit includes a point modifier applicable to a quantity of points subsequently earned by the user. In these embodiments, in exchange for a user participating in the allocation of points to an entity, the system determines a benefit of a point modifier which can be subsequently activated. In certain embodiments, the determined benefit additionally or alternatively includes a point modifier applicable to a quantity of points previously earned by the user. In these embodiments, in exchange for a user participating in the allocation of one or more points to an entity, the system determines a benefit of a point modifier which can be activated against previously earned points (and/or subsequently earned points).

In certain embodiments, the determined benefit includes a quantity of promotional credits and/or virtual credits usable to fund one or more plays of one or more games of chance (and/or games of skill). In certain other embodiments, the determined benefit additionally or alternatively includes a quantity of promotional credits and/or virtual credits usable to fund one or more plays of one or more online games of chance (and/or games of skill) accessible remote from the gaming establishment. It should be appreciated that while such promotional credits have an actual value (i.e., the average expected value of the game(s) played which are funded by such promotional credits), since the games played using such promotional credits and/or virtual credits may result in one or more awards different than the average expected value of such games, the user may ultimately realize a different valued benefit.

It should be appreciated that in these embodiments, since the conditional prize, the points, the promotional credits, the virtual credits, and the point modifier have static values, such benefits are associated with known benefits. That is, unlike certain benefits, such as an entry into a drawing or a play of a game of chance (and/or a game of skill), which may result in the user obtaining no value (i.e., a zero value benefit) or which may result in the user obtaining a positive valued benefit (and thus represent opportunities to obtain a benefit), other benefits will result in the user obtaining value (upon the satisfaction of zero, one or more conditions).

In certain embodiments, the determined benefit includes a feature usable in association with a play of a game. That is, the determined benefit is associated with one or more plays of one or more games and a modification or activation to one or more game play features and/or an addition or unlocking of one or more game play features. In certain of these embodiments, the determined benefit includes altering or otherwise modifying one or more features, aspects or parameters of one or more subsequently played games. In these embodiments, a determined benefit includes any suitable feature which modifies any aspect of any game subsequently played by the user which is associated with the offered benefit. In various embodiments, one or more features employed as a determined benefit to modify one or more aspects of one or more such games played include, but are not limited to: a feature modifying one or more symbols available to be generated for a subsequent play of a game; a feature modifying one or more wild symbols available to be generated for a subsequent play of a game; a feature modifying a quantity of reels to be used for a subsequent play of a game; a feature modifying which of a plurality of reel are to be used for a subsequent play of a game; a feature modifying a deck of playing cards to be used for a subsequent play of a game; a feature modifying a quantity of playing cards to be used for a subsequent play of a game; a feature modifying a quantity of poker hands to be dealt for a subsequent play of a game; a book-end wild symbols feature; a stacked wild symbols feature; an expanding wild symbols feature; a retrigger symbol feature; an anti-terminator symbol feature; a locking reel feature, a locking symbol position feature; a modifier, such as a multiplier, feature; a feature modifying an amount of credits of a credit balance; a feature modifying an amount of promotional credits; a feature modifying a placed wager amount (e.g., a player placed a bet of $1 which is treated by the EGM as a bet of $2); a feature modifying a placed side wager amount; a feature modifying a rate of earning player tracking points; a feature modifying a rate of earning promotional credits; a feature modifying a rate of earning virtual credits; a feature modifying a number of wagered on paylines; a feature modifying a wager placed on one or more paylines (or on one or more designated paylines); a feature modifying a number of ways to win wagered on; a feature modifying a wager placed on one or more ways to win (or on one or more designated ways to win); a feature modifying an average expected payback percentage of a subsequent play of a game; a feature modifying an average expected payout of a subsequent play of a game; a feature modifying one or more awards available; a feature modifying a range of awards available; a feature modifying a type of awards available; a feature modifying one or more progressive awards; a feature modifying which progressive awards are available to be won; a feature modifying one or more modifiers, such as multipliers, available; a feature modifying an activation of a reel (or a designated reel); a feature modifying an activation of a plurality of reels; a feature modifying a generated outcome (or a designated generated outcome); a feature modifying a generated outcome (or a designated generated outcome) associated with an award over a designated value; a feature modifying a generated outcome (or a designated generated outcome) on a designated payline; a feature modifying a generated outcome (or a designated generated outcome) in a scatter configuration; a feature modifying a winning way to win (or a designated winning way to win); a feature modifying a designated symbol or symbol combination; a feature modifying a generation of a designated symbol or symbol combination on a designated payline; a feature modifying a generation of a designated symbol or symbol combination in a scatter configuration; a feature modifying a triggering event of a play of a secondary or bonus game; a feature modifying an activation of a secondary or bonus display (such as an award generator); a feature modifying a quantity of activations of a secondary or bonus display (e.g., a feature modifying a quantity of spins of an award generator); a feature modifying a quantity of sections of a secondary or bonus display (e.g., a feature modifying a quantity of sections of an award generator); a feature modifying one or more awards of a secondary or bonus display; a feature modifying an activation of a community award generator; a feature modifying a quantity of activations of a community award generator; a feature modifying a quantity of sections of a community award generator; a feature modifying one or more awards of a community award generator; a feature modifying a generated outcome (or a designated generated outcome) in a secondary game; a feature modifying a quantity of picks in a selection game (e.g., provide a player four picks in a selection game otherwise associated with 3 picks); a feature modifying a quantity of offers in an offer and acceptance game; a feature modifying a quantity of moves in a trail game; a feature modifying an amount of free spins provided; a feature modifying a game terminating or ending condition; a feature modifying an availability of a secondary game; a feature modifying a theme of a game; and/or a feature modifying any game play feature associated with any play of any game disclosed herein.

In certain embodiments, the determined benefit includes one or more of any suitable benefit, such as a quantity of monetary credits, a quantity of non-monetary credits, a quantity of promotional credits, a quantity of player tracking points, a progressive award, a modifier, such as a multiplier, a quantity of free plays of one or more games, a quantity of plays of one or more secondary or bonus games, a multiplier of a quantity of free plays of a game, one or more lottery based awards, such as lottery or drawing tickets, a wager match for one or more plays of one or more games, an increase in the average expected payback percentage for one or more plays of one or more games, one or more comps, such as a free meal at a buffet, a free night's stay at a hotel, an upgrade for a stay at a hotel, tickets to a show, a high value product such as a car, or a low value product, one or more bonus credits usable for online play, a lump sum of player tracking points or credits, a multiplier for player tracking points or credits, an increase in a membership or player tracking level, one or more coupons or promotions usable within and/or outside of the gaming establishment (e.g., a $10 off coupon for a show), virtual goods associated with one or more gaming establishment components, and/or virtual goods not associated with any gaming establishment components.

It should be appreciated that in certain embodiments, to prevent certain users from obtaining an insurmountable point lead on one or more leaderboards, the system employs points which expire after a designated amount of time. In certain other embodiments, once a benefit is determined and displayed in association with a user based on that user having a designated ranking based on a quantity of allocated points, the system causes such points to expire.

ALTERNATIVE EMBODIMENTS

It should be appreciated that in different embodiments, one or more of:
  i. which entities of an enterprise to maintain one or more leaderboards for;
  ii. a quantity of entities of an enterprise to maintain leaderboards for;
  iii. when a point accumulation event, a point redemption event and/or a benefit realization event occurs;
  iv. a quantity of points to accumulate upon an occurrence of a point accumulation event;
  v. which users to provide a benefit to upon an occurrence of a benefit realization event;
  vi. which benefit to provide to a user upon an occurrence of a benefit realization event;
  vii. whether to cause any accumulated and/or allocated points to expire; and/or
  viii. any determination disclosed herein;
is/are predetermined, randomly determined, randomly determined based on one or more weighted percentages, determined based on a generated symbol or symbol combination, determined independent of a generated symbol or symbol combination, determined based on a random determination by the central controller, determined independent of a random determination by the central controller, determined based on a random determination at the system, determined independent of a random determination at the system, determined based on at least one play of at least one game, determined independent of at least one play of at least one game, determined based on a user's selection, determined independent of a user's selection, determined based on one or more side wagers placed, determined independent of one or more side wagers placed, determined based on a primary game wager, determined independent of a primary game wager, determined based on time (such as the time of day), determined independent of time (such as the time of day), determined based on an amount of coin-in accumulated in one or more pools, determined independent of an amount of coin-in accumulated in one or more pools, determined based on a status of the user (i.e., a player tracking status of the user), determined independent of a status of the user (i.e., a player tracking status of the user), determined based on one or more other determinations disclosed herein, determined independent of any other determination disclosed herein or determined based on any other suitable method or criteria.

Systems

The above-described embodiments of the present disclosure may be implemented in accordance with or in conjunction with one or more of a variety of different types of systems, such as, but not limited to, those described below.

The present disclosure contemplates a variety of different systems each having one or more of a plurality of different features, attributes, or characteristics. In certain embodiments the system disclosed herein refers to various configurations of: (a) one or more central servers, central controllers, or remote hosts; and/or (b) one or more personal devices, such as desktop computers, laptop computers, tablet computers or computing devices, personal digital assistants, mobile phones, and other mobile computing devices. In certain other embodiments wherein the present disclosure is employed in association with a gaming establishment, the system disclosed herein refers to various configurations of: (a) one or more central servers, central controllers, or remote hosts; (b) one or more personal devices, such as desktop computers, laptop computers, tablet computers or computing devices, personal digital assistants, mobile phones, and other mobile computing devices; and/or (c) one or more electronic gaming machines such as those located on a casino floor.

Thus, in various embodiments, the system of the present disclosure includes: (a) one or more electronic gaming machines in combination with one or more central servers, central controllers, or remote hosts; (b) one or more personal devices in combination with one or more central servers, central controllers, or remote hosts; (c) one or more personal devices in combination with one or more electronic gaming machines; (d) one or more personal devices, one or more electronic gaming machines, and one or more central servers, central controllers, or remote hosts in combination with one another; (e) a single electronic gaming machine; (f) a plurality of electronic gaming machines in combination with one another; (g) a single personal device; (h) a plurality of personal devices in combination with one another; (i) a single central server, central controller, or remote host; and/or (j) a plurality of central servers, central controllers, or remote hosts in combination with one another.

For brevity and clarity and unless specifically stated otherwise, "personal device" as used herein represents one personal device or a plurality of personal devices, "central server, central controller, or remote host" as used herein represents one central server, central controller, or remote host or a plurality of central servers, central controllers, or remote hosts, and "EGM" as used herein represents one electronic gaming machine ("EGM") or a plurality of EGMs.

As noted above, in various embodiments, the system includes a personal device (or EGM) in combination with a central server, central controller, or remote host. In such embodiments, the personal device (or EGM) is configured to communicate with the central server, central controller, or remote host through a data network or remote communication link. In certain such embodiments, the personal device (or EGM) is configured to communicate with another personal device (or EGM) through the same data network or remote communication link or through a different data network or remote communication link. For example, the system includes a plurality of EGMs that are each configured to communicate with a central server, central controller, or remote host through a data network.

In certain embodiments in which the system includes a personal device (or EGM) in combination with a central server, central controller, or remote host, the central server, central controller, or remote host is any suitable computing device (such as a server) that includes at least one processor and at least one memory device or data storage device. As further described herein, the personal device (or EGM) includes at least one personal device (or EGM) processor configured to transmit and receive data or signals representing events, messages, commands, or any other suitable information between the personal device (or EGM) and the central server, central controller, or remote host. The at least one processor of that personal device (or EGM) is configured to execute the events, messages, or commands represented by such data or signals in conjunction with the operation of the personal device (or EGM). Moreover, the at least one processor of the central server, central controller, or remote host is configured to transmit and receive data or signals representing events, messages, commands, or any other suitable information between the central server, central controller, or remote host and the personal device (or EGM). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the personal device (or EGM). Further, one, more than one, or each of the functions of the at least one processor of the personal device (or EGM) may be performed by the at least one processor of the central server, central controller, or remote host.

In certain such embodiments, computerized instructions for operating the system are executed by the central server, central controller, or remote host. In such "thin client" embodiments, the central server, central controller, or remote host remotely operates the system (or other suitable interfaces) displayed by the personal device (or EGM), and the personal device (or EGM) is utilized to display one or more suitable interfaces and to receive one or more inputs or commands. In other such embodiments, computerized instructions for operating the system are communicated from the central server, central controller, or remote host to the personal device (or EGM) and are stored in at least one memory device of the personal device (or EGM). In such "thick client" embodiments, the at least one processor of the personal device (or EGM) executes the computerized instructions to operate the system (or other suitable interfaces) displayed by the personal device (or EGM).

In various embodiments in which the system includes a plurality of personal devices (or EGMs), one or more of the personal devices (or EGMs) are thin client personal devices (or EGMs) and one or more of the personal devices (or EGMs) are thick client personal devices (or EGMs). In other embodiments in which the system includes one or more personal devices (or EGMs), certain functions of one or more of the personal devices (or EGMs) are implemented in a thin client environment, and certain other functions of one or more of the personal devices (or EGMs) are implemented in a thick client environment. In one such embodiment in which the system includes a personal device (or EGM) and a central server, central controller, or remote host, computerized instructions for operating part of the system are communicated from the central server, central controller, or remote host to the personal device (or EGM) in a thick client configuration, and computerized instructions for other functions displayed by the personal device (or EGM) are executed by the central server, central controller, or remote host in a thin client configuration.

In certain embodiments in which the system includes: (a) a personal device (or EGM) configured to communicate with a central server, central controller, or remote host through a data network; and/or (b) a plurality of personal devices (or EGMs) configured to communicate with one another through a data network, the data network is a local area network (LAN) in which the personal devices (or EGMs) are located substantially proximate to one another and/or the central server, central controller, or remote host.

In other embodiments in which the system includes: (a) a personal device (or EGM) configured to communicate with a central server, central controller, or remote host through a data network; and/or (b) a plurality of personal devices (or EGMs) configured to communicate with one another through a data network, the data network is a wide area network (WAN) in which one or more of the personal devices (or EGMs) are not necessarily located substantially proximate to another one of the personal devices (or EGMs) and/or the central server, central controller, or remote host.

In further embodiments in which the system includes: (a) a personal device (or EGM) configured to communicate with a central server, central controller, or remote host through a data network; and/or (b) a plurality of personal devices (or EGMs) configured to communicate with one another through a data network, the data network is an internet (such as the Internet) or an intranet. In certain such embodiments, an Internet browser of the personal device (or EGM) is usable to access an Internet page from any location where an Internet connection is available. In one such embodiment, after the personal device (or EGM) accesses the Internet page, the central server, central controller, or remote host identifies a user before enabling that user allocate any points to any entities. In one example, the central server, central controller, or remote host identifies the user by requiring a user account of the user to be logged into via an input of a unique user name and password combination assigned to the user. The central server, central controller, or remote host may, however, identify the user in any other suitable manner, such as by validating a player tracking identification number associated with the user; by reading a player tracking card or other smart card inserted into a card reader (as described below); by validating a unique user identification number associated with the user by the central server, central controller, or remote host; or by identifying the personal device (or EGM), such as by identifying the MAC address or the IP address of the Internet facilitator. In various embodiments, once the central server, central controller, or remote host identifies the user, the central server, central controller, or remote host enables the allocation of points to one or more entities via the Internet browser of the personal device (or EGM). Examples of implementations of Internet-based gaming are further described in U.S. Pat. No. 8,764,566, entitled "Internet Remote Game Server," and U.S. Pat. No. 8,147,334, entitled "Universal Game Server".

The central server, central controller, or remote host and the personal device (or EGM) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium.

EGM Components

Figure 3:
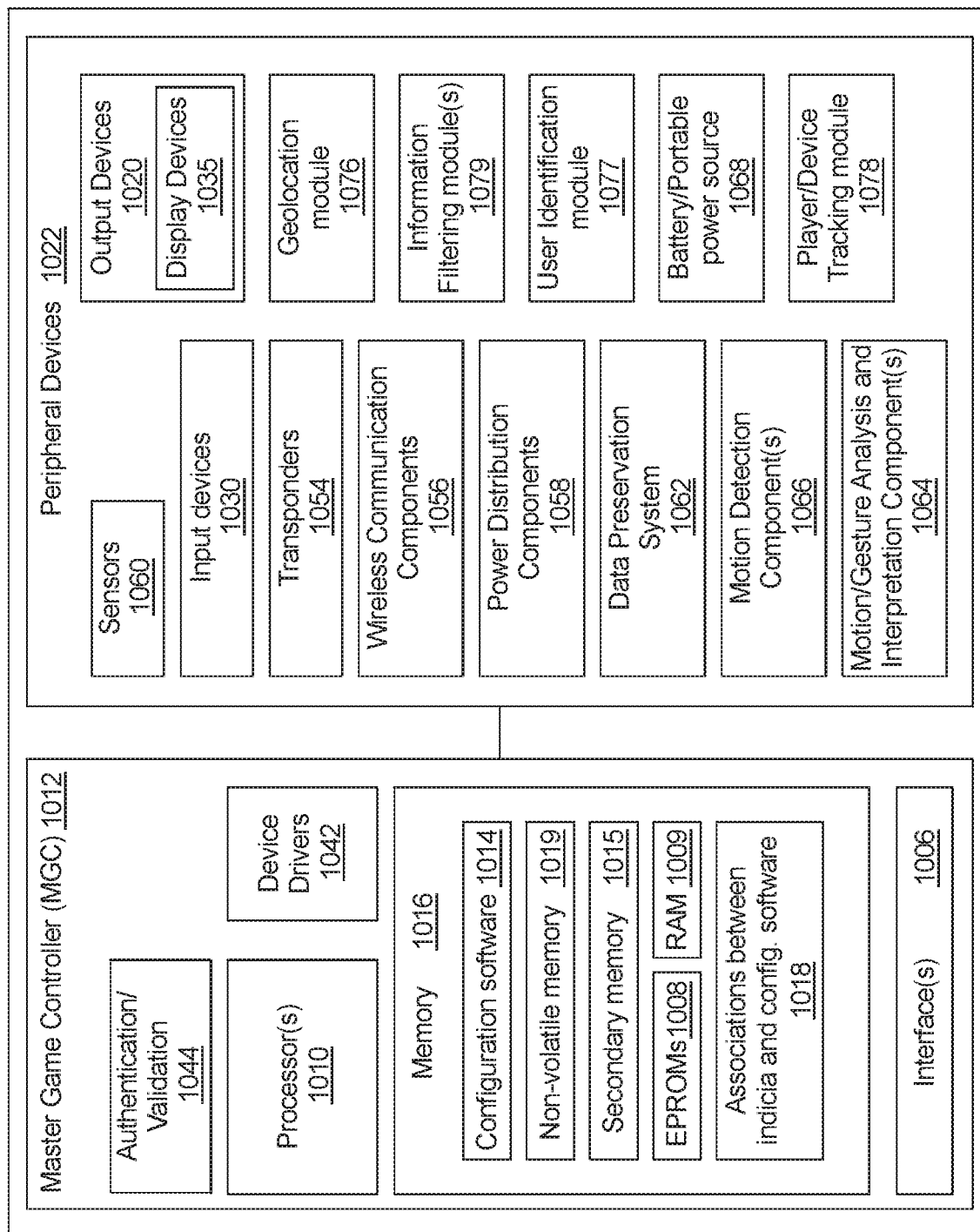
FIG. 3 is a schematic block diagram of one embodiment of an electronic configuration of an example system disclosed herein.

As described herein, in certain embodiments, the enterprise loyalty program is implemented in association with one or more EGMs. FIG. 3 is a block diagram of an example EGM 1000 and FIGS. 4A and 4B include two different example EGMs 2000a and 2000b. The EGMs 1000, 2000a, and 2000b are merely example EGMs, and different EGMs may be implemented using different combinations of the components shown in the EGMs 1000, 2000a, and 2000b. Although the below refers to EGMs, in various embodiments personal gaming devices (such as personal gaming device 2000c of FIG. 4C) may include some or all of the below components.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM disclosed herein. In certain embodiments, the at least one memory device 1016 resides within the housing of the EGM (described below), while in other embodiments at least one component of the at least one memory device 1016 resides outside of the housing of the EGM. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a user uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, player input device components, information received from one or more player input devices, information stored in the at least one memory device 1016, etc. Examples of various authentication and/or validation components are described in U.S. Pat. No. 6,620,047, entitled "Electronic Gaming Apparatus Having Authentication Data Sets".

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one player identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 2000*a* illustrated in FIG. 4A includes a central display device 2116, a player tracking display 2140, a credit display 2120, and a bet display 2122. The example EGM 2000*b* illustrated in FIG. 4B includes a central display device 2116, an upper display device 2118, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the user or player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000*a* and 2000*b* illustrated in FIGS. 4A and 4B each include a ticket printer and dispenser 2136. Examples of ticket-in ticket-out (TITO) technology are described in U.S. Pat. No. 5,429,361, entitled "Gaming Machine Information, Communication and Display System"; U.S. Pat. No. 5,470,079, entitled "Gaming Machine Accounting and Monitoring System"; U.S. Pat. No. 5,265,874, entitled "Cashless Gaming Apparatus and Method"; U.S. Pat. No. 6,729,957, entitled "Gaming Method and Host Computer with Ticket-In/Ticket-Out Capability"; U.S. Pat. No. 6,729,958, entitled "Gaming System with Ticket-In/Ticket-Out Capability"; U.S. Pat. No. 6,736,725, entitled "Gaming Method and Host Computer with Ticket-In/Ticket-Out Capability"; U.S. Pat. No. 7,275,991, entitled "Slot Machine with Ticket-In/Ticket-Out Capability"; and U.S. Pat. No. 6,048,269, entitled "Coinless Slot Machine System and Method".

In certain embodiments, rather than dispensing bills, coins, or a physical ticket having a monetary value to the player (i.e., the user of the enterprise loyalty program engaging an EGM) following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player. Examples of providing payment using virtual tickets are described in U.S. Pat. No. 8,613,659, entitled "Virtual Ticket-In and Ticket-Out on a Gaming Machine".

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000*a* and 2000*b* illustrated in FIGS. 4A and 4B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000*a* and 2000*b* illustrated in FIGS. 4A and 4B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. Examples of funding an EGM via communication between the EGM and a mobile device (such as a mobile phone) of a player are described in U.S. Patent Application Publication No. 2013/0344942, entitled "Avatar as Security Measure for Mobile Device Use with Electronic Gaming Machine". When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000*a* and 2000*b* illustrated in FIGS. 4A and 4B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000*a* and 2000*b* illustrated in FIGS. 4A and 4B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 4A and 4B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs 2000*a* and 2000*b* illustrated in FIGS. 4A and 4B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more player input devices near the EGM. In one embodiment, a player input device docking region is provided, and includes a power distribution component that is configured to recharge a player input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., player input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one player identification module 1077 is configured to determine the identity of the current player or current owner of the EGM. For example, in one embodiment, the current player is required to perform a login process at the EGM in order to access one or more features. Alternatively, the EGM is configured to automatically determine the identity of the current player based on one or more external signals, such as an RFID tag or badge worn by the current player and that provides a wireless signal to the EGM that is used to determine the identity of the current player. In at least one embodiment, various security features are incorporated into the EGM to prevent unauthorized players from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. U.S. Pat. No. 7,290,072 describes a variety of EGMs including one or more communication ports that enable the EGMs to communicate and operate with one or more external peripherals.

Figure 4A:
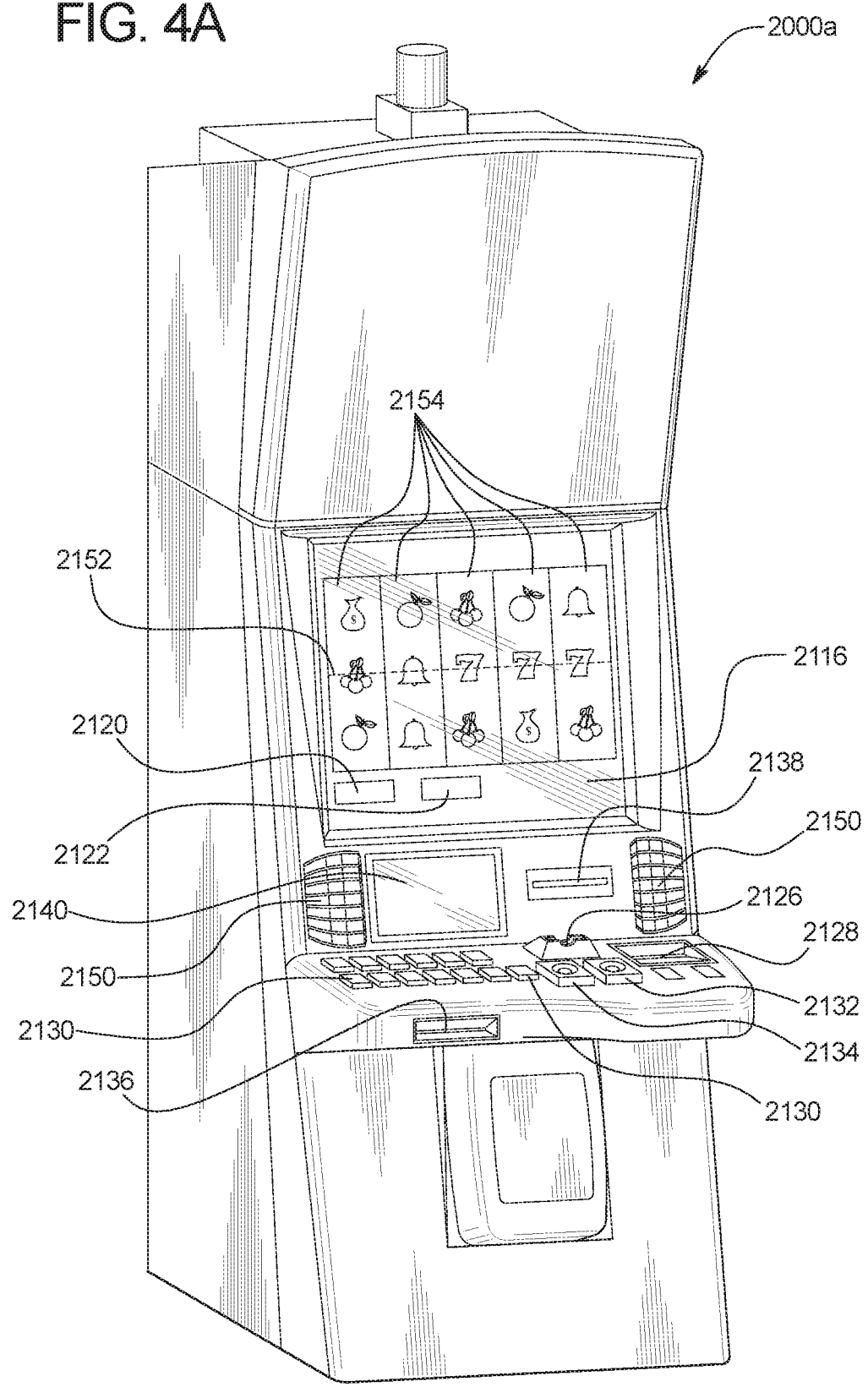
FIGS. 4A and 4B are perspective views of example alternative embodiments of the system disclosed herein.
Figure 4B:
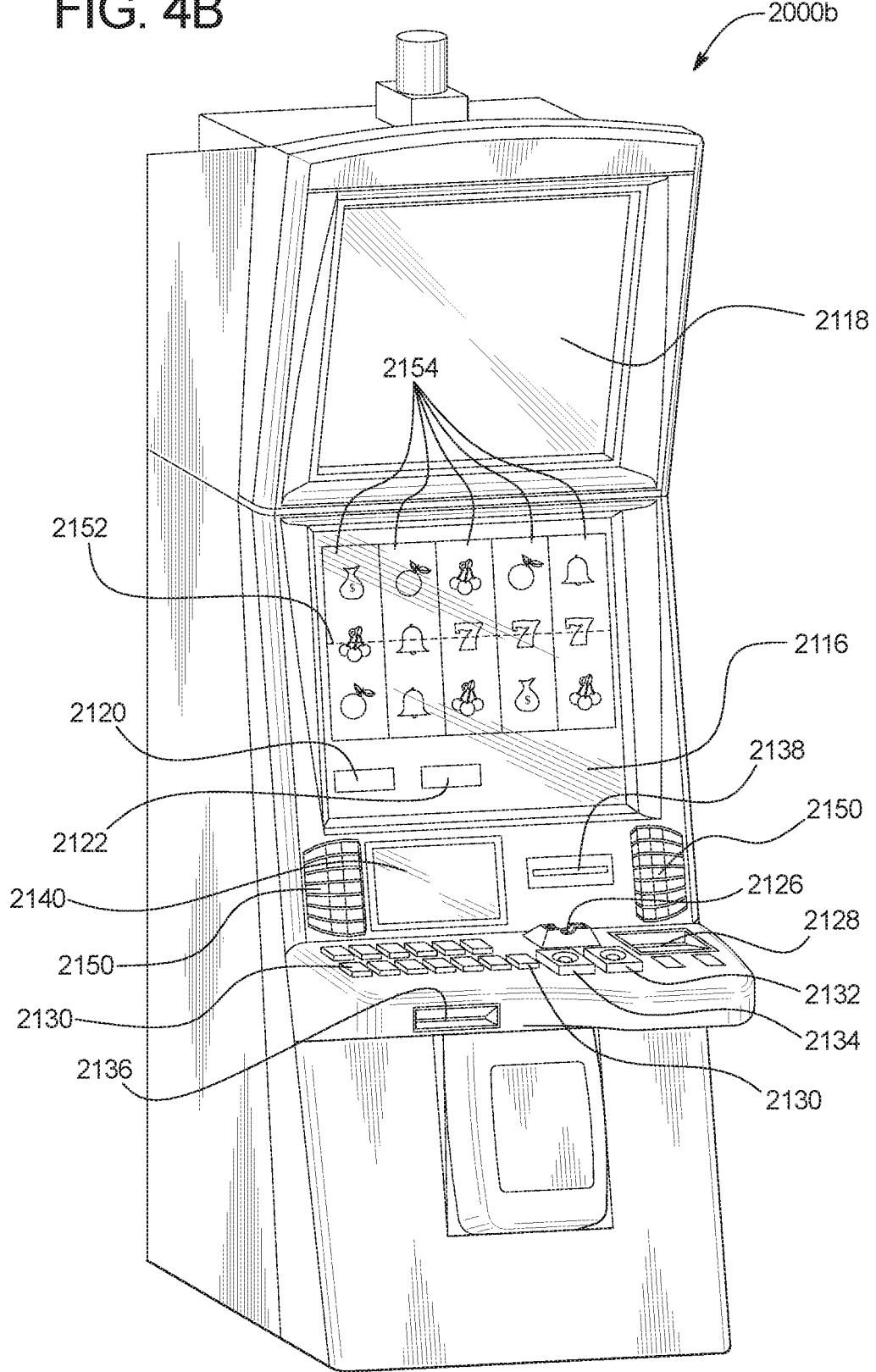
Figure 4C:
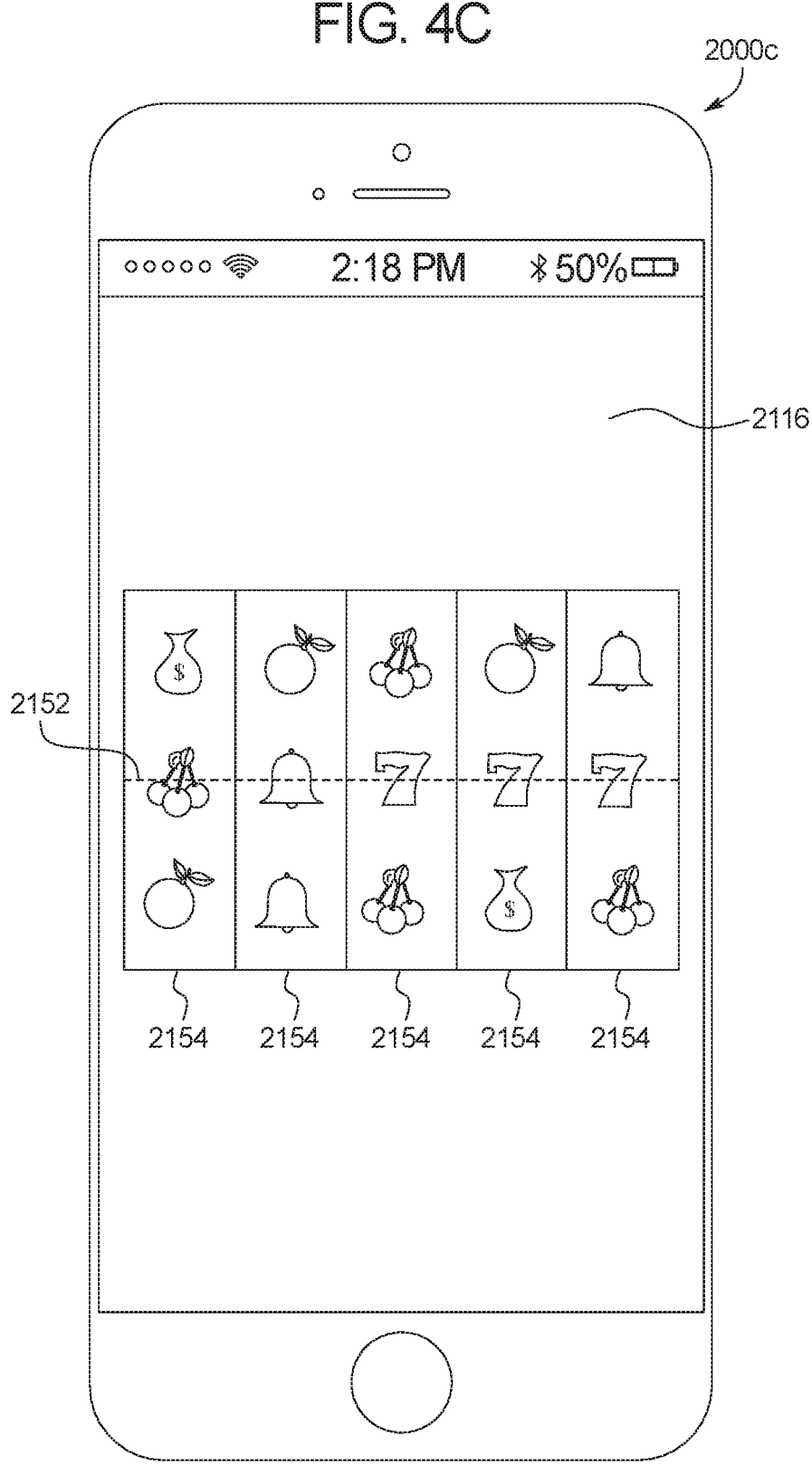
FIG. 4C is a front view of an example personal device of the system disclosed herein.

As generally described above, in certain embodiments, such as the example EGMs 2000a and 2000b illustrated in FIGS. 4A and 4B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000a and 2000b shown in FIGS. 4A and 4B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all systems, and these example EGMs may not include one or more elements that are included in other systems. For example, certain EGMs include a coin acceptor while others do not.

Operation of Primary or Base Games and/or Secondary or Bonus Games

In various embodiments wherein the system is employed in association with an EGM, the EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM before delivery to a gaming establishment or before being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the system generates the game outcome(s) and/or the award(s) to be provided based on the associated probabilities. In these embodiments, since the system generates game outcomes and/or awards randomly or based on one or more probability calculations, there is no certainty that the system will ever provide any specific game outcome and/or award.

In certain embodiments, the system maintains one or more predetermined pools or sets of predetermined game outcomes and/or awards. In certain such embodiments, upon generation or receipt of a game outcome and/or award request, the system independently selects one of the predetermined game outcomes and/or awards from the one or more pools or sets. The system flags or marks the selected game outcome and/or award as used. Once a game outcome or an award is flagged as used, it is prevented from further selection from its respective pool or set; that is, the system does not select that game outcome or award upon another game outcome and/or award request. The system provides the selected game outcome and/or award. Examples of this type of award evaluation are described in U.S. Pat. No. 7,470,183, entitled "Finite Pool Gaming Method and Apparatus"; U.S. Pat. No. 7,563,163, entitled "Gaming Device Including Outcome Pools for Providing Game Outcomes"; U.S. Pat. No. 7,833,092, entitled "Method and System for Compensating for Player Choice in a Game of Chance"; U.S. Pat. No. 8,070,579, entitled "Bingo System with Downloadable Common Patterns"; and U.S. Pat. No. 8,398,472, entitled "Central Determination Poker Game".

In certain embodiments, the system determines a predetermined game outcome and/or award based on the results of a bingo, keno, or lottery game. In certain such embodiments, the system utilizes one or more bingo, keno, or lottery games to determine the predetermined game outcome and/or award provided for a primary game and/or a secondary game. The system is provided or associated with a bingo card. Each bingo card consists of a matrix or array of elements, wherein each element is designated with separate indicia. After a bingo card is provided, the system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. Examples of this type of award determination are described in U.S. Pat. No. 7,753,774, entitled "Using Multiple Bingo Cards to Represent Multiple Slot Paylines and Other Class III Game Options"; U.S. Pat. No. 7,731,581, entitled "Multi-Player Bingo Game with Multiple Alternative Outcome Displays"; U.S. Pat. No. 7,955,170, entitled "Providing Non-Bingo Outcomes for a Bingo Game"; U.S. Pat. No. 8,070,579, entitled "Bingo System with Downloadable Common Patterns"; and U.S. Pat. No. 8,500,538, entitled "Bingo Gaming System and Method for Providing Multiple Outcomes from Single Bingo Pattern".

In certain embodiments in which the system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the system includes a real-time or online accounting and gaming information system configured to communicate with the central server, central controller, or remote host. In this embodiment, the accounting and gaming information system includes: (a) a player database configured to store player profiles, (b) a player tracking module configured to track players (as described below), and (c) a credit system configured to provide automated transactions. Examples of such accounting systems are described in U.S. Pat. No. 6,913,534, entitled "Gaming Machine Having a Lottery Game and Capability for Integration with Gaming Device Accounting System and Player Tracking System," and U.S. Pat. No. 8,597,116, entitled "Virtual Player Tracking and Related Services".

As noted above, in various embodiments, the system includes one or more executable game programs executable by at least one processor of the system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the system. In certain such embodiments, the system includes one or more paylines associated with the reels. The example EGM 2000b shown in FIG. 4B includes a payline 1152 and a plurality of reels 1154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The system enables a wager to be placed on one or more of such paylines to activate such paylines. In other embodiments in which one or more paylines are formed between at least two adjacent symbol display areas, the system enables a wager to be placed on a plurality of symbol display areas, which activates those symbol display areas.

In various embodiments, the system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. Examples of ways to win award determinations are described in U.S. Pat. No. 8,012,011, entitled "Gaming Device and Method Having Independent Reels and Multiple Ways of Winning"; U.S. Pat. No. 8,241,104, entitled "Gaming Device and Method Having Designated Rules for Determining Ways To Win"; and U.S. Pat. No. 8,430,739, entitled "Gaming System and Method Having Wager Dependent Different Symbol Evaluations".

In various embodiments, the system includes a progressive award. Typically, a progressive award includes an initial amount and an additional amount funded through a portion of each wager placed to initiate a play of a primary game. When one or more triggering events occurs, the system provides at least a portion of the progressive award. After the system provides the progressive award, an amount of the progressive award is reset to the initial amount and a portion of each subsequent wager is allocated to the next progressive award. Examples of progressive systems are described in U.S. Pat. No. 7,585,223, entitled "Server Based Gaming System Having Multiple Progressive Awards"; U.S. Pat. No. 7,651,392, entitled "Gaming Device System Having Partial Progressive Payout"; U.S. Pat. No. 7,666,093, entitled "Gaming Method and Device Involving Progressive Wagers"; U.S. Pat. No. 7,780,523, entitled "Server Based Gaming System Having Multiple Progressive Awards"; and U.S. Pat. No. 8,337,298, entitled "Gaming Device Having Multiple Different Types of Progressive Awards".

As generally noted above, in addition to providing winning credits or other awards for one or more plays of the primary game(s), in various embodiments the system provides credits or other awards for one or more plays of one or more secondary games. The secondary game typically enables an award to be obtained addition to any award obtained through play of the primary game(s). The secondary game(s) typically produces a higher level of excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the system automatically provides or initiates the secondary game upon the occurrence of a triggering event or the satisfaction of a qualifying condition. In other embodiments, the system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. Examples of group systems are described in U.S. Pat. No. 8,070,583, entitled "Server Based System and Method for Selectively Providing One or More Different Tournaments"; U.S. Pat. No. 8,500,548, entitled "Gaming System and Method for Providing Team Progressive Awards"; and U.S. Pat. No. 8,562,423, entitled "Method and Apparatus for Rewarding Multiple Game Players for a Single Win".

In various embodiments, the system includes one or more player tracking systems. Such player tracking systems enable operators of the system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the system to begin a gaming session, the card reader reads the player identification number off the player tracking card to identify the player. The system timely tracks any suitable information or data relating to the identified player's gaming session. The system also timely tracks when the player tracking card is removed to conclude play for that gaming session. In another embodiment, rather than requiring insertion of a player tracking card into the card reader, the system utilizes one or more portable devices, such as a mobile phone, a radio frequency identification tag, or any other suitable wireless device, to track when a gaming session begins and ends. In another embodiment, the system utilizes any suitable biometric technology or ticket technology to track when a gaming session begins and ends.

In such embodiments, during one or more gaming sessions, the system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. Examples of player tracking systems are described in U.S. Pat. No. 6,722,985, entitled "Universal Player Tracking System"; U.S. Pat. No. 6,908,387, entitled "Player Tracking Communication Mechanisms in a Gaming Machine"; U.S. Pat. No. 7,311,605, entitled "Player Tracking Assembly for Complete Patron Tracking for Both Gaming and Non-Gaming Casino Activity"; U.S. Pat. No. 7,611,411, entitled "Player Tracking Instruments Having Multiple Communication Modes"; U.S. Pat. No. 7,617,151, entitled "Alternative Player Tracking Techniques"; and U.S. Pat. No. 8,057,298, entitled "Virtual Player Tracking and Related Services".

Web-Based Gaming

In various embodiments, the system includes one or more servers configured to communicate with a personal device—such as a smartphone, a tablet computer, a desktop computer, or a laptop computer—to employ the enterprise loyalty program disclosed herein and/or enable web-based game play using the personal device. In various embodiments, the user must first access a website via an Internet browser of the personal device or execute an application (commonly called an "app") installed on the personal device before the user can use the personal device to participate in the enterprise loyalty program and/or the web-based game play. In certain embodiments, the one or more servers and the personal device operate in a thin-client environment. In these embodiments, the personal device receives inputs via one or more input devices (such as a touch screen and/or physical buttons), the personal device sends the received inputs to the one or more servers, the one or more servers make various determinations based on the inputs and determine content to be displayed (such as a randomly determined game outcome and corresponding award), the one or more servers send the content to the personal device, and the personal device displays the content.

In certain such embodiments, the one or more servers must identify the user before enabling participation in the enterprise loyalty program and/or game play on the personal device (or, in some embodiments, before enabling monetary wager-based game play on the personal device). In these embodiments, the user must identify herself to the one or more servers, such as by inputting the user's unique username and password combination, providing an input to a biometric sensor (e.g., a fingerprint sensor, a retinal sensor, a voice sensor, or a facial-recognition sensor), or providing any other suitable information.

Once identified, the one or more servers enable the user to establish an account balance from which the user can draw credits usable to wager on plays of a game. In certain embodiments, the one or more servers enable the user to initiate an electronic funds transfer to transfer funds from a bank account to the user's account balance. In other embodiments, the one or more servers enable the user to make a payment using the user's credit card, debit card, or other suitable device to add money to the user's account balance. In other embodiments, the one or more servers enable the user to add money to the user's account balance via a peer-to-peer type application, such as PayPal or Venmo. The one or more servers also enable the user to cash out the user's account balance (or part of it) in any suitable manner, such as via an electronic funds transfer, by initiating creation of a paper check that is mailed to the user, or by initiating printing of a voucher at a kiosk in a gaming establishment.

In certain embodiments, the one or more servers include a payment server that handles establishing and cashing out users' account balances and a separate game server configured to determine the outcome and any associated award for a play of a game. In these embodiments, the game server is configured to communicate with the personal device and the payment device, and the personal device and the payment device are not configured to directly communicate with one another. In these embodiments, when the game server receives data representing a request to start a play of a game at a desired wager, the game server sends data representing the desired wager to the payment server. The payment server determines whether the user's account balance can cover the desired wager (i.e., includes a monetary balance at least equal to the desired wager).

If the payment server determines that the user's account balance cannot cover the desired wager, the payment server notifies the game server, which then instructs the personal device to display a suitable notification to the user that the user's account balance is too low to place the desired wager. If the payment server determines that the user's account balance can cover the desired wager, the payment server deducts the desired wager from the account balance and notifies the game server. The game server then determines an outcome and any associated award for the play of the game. The game server notifies the payment server of any nonzero award, and the payment server increases the user's account balance by the nonzero award. The game server sends data representing the outcome and any award to the personal device, which displays the outcome and any award.

In certain embodiments, the one or more servers enable participation in the enterprise loyalty program and/or web-based game play using a personal device only if the personal device satisfies one or more jurisdictional requirements. In one embodiment, the one or more servers enable participation in the enterprise loyalty program and/or web-based game play using the personal device only if the personal device is located within a designated geographic area (such as within certain state or county lines or within the boundaries of a gaming establishment). In this embodiment, the geolocation module of the personal device determines the location of the personal device and sends the location to the one or more servers, which determine whether the personal device is located within the designated geographic area. In various embodiments, the one or more servers enable non-monetary wager-based game play if the personal device is located outside of the designated geographic area.

In various embodiments, the system includes an EGM configured to communicate with a personal device—such as a smartphone, a tablet computer, a desktop computer, or a laptop computer—to enable tethered mobile game play using the personal device. Generally, in these embodiments, the EGM establishes communication with the personal device and enables the user to play games on the EGM remotely via the personal device. In certain embodiments, the system includes a geo-fence system that enables tethered game play within a particular geographic area but not outside of that geographic area. Examples of tethering an EGM to a personal device and geo-fencing are described in U.S. Patent Appl. Pub. No. 2013/0267324, entitled "Remote Gaming Method Allowing Temporary Inactivation Without Terminating Playing Session Due to Game Inactivity".

Social Network Integration

In certain embodiments, the system is configured to communicate with a social network server that hosts or partially hosts a social networking website via a data network (such as the Internet) to integrate a user's experience with the user's social networking account. This enables the system to send certain information to the social network server that the social network server can use to create content (such as text, an image, and/or a video) and post it to the user's wall, newsfeed, or similar area of the social networking website accessible by the user's connections (and in certain cases the public) such that the user's connections can view that information. This also enables the system to receive certain information from the social network server, such as the user's likes or dislikes or the user's list of connections. In certain embodiments, the system enables the user to link the user's user account to the user's social networking account(s). This enables the system to, once it identifies the user and initiates a session (such as via the user logging in to a website (or an application) on the user's personal device), link that session to the user's social networking account(s). In other embodiments, the system enables the user to link the user's social networking account(s) to individual sessions when desired by providing the required login information.

For instance, in one embodiment, if a user obtains a benefit as part of the enterprise loyalty program, the system sends information about the benefit to the social network server to enable the server to create associated content and to post that content to the user's wall (or other suitable area) of the social networking website for the user's connections to see (and to entice them to participate in the enterprise loyalty program). In another embodiment, if the user consents, the system sends advertisement information or offer information to the social network server to enable the social network server to create associated content (such as text or an image reflecting an advertisement and/or an offer) and to post that content to the user's wall (or other suitable area) of the social networking website for the user's connections to see. In another embodiment, the system enables the user to recommend the enterprise loyalty program to the user's connections by posting a recommendation to the user's wall (or other suitable area) of the social networking website.

Differentiating Certain Systems from General Purpose Computing Devices

Certain of the systems described herein employ one or more EGMs which include certain components and/or are configured to operate in certain manners that differentiate these systems from general purpose computing devices, i.e., certain personal devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code. Examples of EGM code authentication are described in U.S. Pat. No. 6,962,530, entitled "Authentication in a Secure Computerized Gaming System"; U.S. Pat. No. 7,043,641, entitled "Encryption in a Secure Computerized Gaming System"; U.S. Pat. No. 7,201,662, entitled "Method and Apparatus for Software Authentication"; and U.S. Pat. No. 8,627,097, entitled "System and Method Enabling Parallel Processing of Hash Functions Using Authentication Checkpoint Hashes".

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in the player's assertion. Examples of a state-based EGM, recovery from malfunctions, and game history are described in U.S. Pat. No. 6,804,763, entitled "High Performance Battery Backed RAM Interface"; U.S. Pat. No. 6,863,608, entitled "Frame Capture of Actual Game Play"; U.S. Pat. No. 7,111,141, entitled "Dynamic NV-RAM"; and U.S. Pat. No. 7,384,339, entitled, "Frame Capture of Actual Game Play".

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives. Examples of trusted memory devices are described in U.S. Pat. No. 6,685,567, entitled "Process Verification".

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected. Examples of trusted memory devices/sources are described in U.S. Pat. No. 7,515,718, entitled "Secured Virtual Network in a Gaming Environment".

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present. Examples of using a mass storage device are described in U.S. Pat. No. 6,149,522, entitled "Method of Authenticating Game Data Sets in an Electronic Casino Gaming System".

Various changes and modifications to the present embodiments described herein will be apparent to those skilled in the art. Such changes and modifications can be made without departing from the spirit and scope of the present subject matter and without diminishing its intended technical scope. It is therefore intended that such changes and modifications be covered by the appended claims.

The invention claimed is:

1. A player tracking unit comprising:
a player tracking card reader;
a first communication interface operable to communicate with a server of a player tracking system;
a second communication interface operable to communicate with a server of an enterprise loyalty system operating distinct and independent from any game being played at any electronic gaming machine;
a third communication interface operable to serially communicate, in accordance with a slot accounting system protocol, with a master gaming controller of an electronic gaming machine;
a processor; and
a memory device that stores a plurality of instructions that, when executed by the processor, cause the processor to:
responsive to a receipt of a player tracking card by the player tracking card reader, communicate, via the first communication interface and to the server of the player tracking system, data associated with an identifier of a user read from the player tracking card,
responsive to a receipt, via the second communication interface, of leaderboard data from the server of the enterprise loyalty system and for each of a plurality of different entities affiliated with an enterprise, cause a display device to display a leaderboard maintained in association with that entity, wherein:
for each entity, the leaderboard maintained for that entity is modifiable, at least in part, based on an exclusive allocation of at least one non-monetary loyalty point to that entity, the exclusive allocation occurring independent from any game being played at any electronic gaming machine,
each enterprise is affiliated with a different plurality of entities, each enterprise is distinct and independent from any electronic gaming machine and any game being played at any electronic gaming machine, and
each of the plurality of different entities affiliated with each enterprise are distinct and independent from any electronic gaming machine and any game being played at any electronic gaming machine, and
responsive to a receipt, via the third communication interface and from the master gaming controller of the electronic gaming machine, of data associated with an occurrence of a point accumulation event associated with the user:
communicate, via the second communication interface, the data associated with the occurrence of the point accumulation event associated with the user to the server of the enterprise loyalty system, and
responsive to a receipt, via the second communication interface and from the server of the enterprise loyalty system, of data associated with an accumulation of a quantity of non-monetary loyalty points in an account maintained for the user by the server of the enterprise loyalty system, cause the display device to display a notification of the accumulation of the quantity of non-monetary loyalty points in the account, wherein when initially accumulated, the quantity of non-monetary loyalty points in the account are not allocated to any of the entities affiliated with the enterprise, after a specific non-monetary loyalty point of the quantity of non-monetary loyalty points is subsequently exclusively allocated to a particular entity of the plurality of different entities, that specific non-monetary loyalty point remains in non-monetary loyalty point form in the account maintained for that user, and when: (i) a first non-monetary loyalty point of the quantity of non-monetary loyalty points is exclusively allocated to a first particular entity prior to any realized benefit event occurring in association with the first non-monetary loyalty point, (ii) a second, different non-monetary loyalty point of the quantity of non-monetary loyalty points is exclusively allocated to a second, different particular entity prior to any realized benefit event occurring in association with the second, different non-monetary loyalty point, and (iii) a realized benefit event occurs in association with the first non-monetary loyalty point executively allocated to the first particular entity, then no benefit is realized in association with the second, different non-monetary loyalty point exclusively allocated to the second, different particular entity.

2. The player tracking unit of claim 1, wherein the point accumulation event occurs based on an activity of the user that is associated with one of the entities affiliated with the enterprise.

3. The player tracking unit of claim 1, wherein the point accumulation event occurs independent of any activity of the user.

4. The player tracking unit of claim 1, wherein the point accumulation event occurs in association with a random determination made by the master gaming controller of the electronic gaming machine that occurs during a play of a game.

5. The player tracking unit of claim 1, wherein different leaderboards are associated with different available benefits for users associated with said leaderboards.

6. The player tracking unit of claim 1, wherein the point accumulation event occurs based on an activity of the user that is associated with the enterprise.

7. A player tracking unit comprising:
a player tracking card reader;
a first communication interface operable to communicate with a server of a player tracking system;
a second communication interface operable to communicate with a server of an enterprise loyalty system operating distinct and independent from any game being played at any electronic gaming machine;
a third communication interface operable to serially communicate, in accordance with a slot accounting system protocol, with a master gaming controller of an electronic gaming machine;
a processor; and
a memory device that stores a plurality of instructions that, when executed by the processor, cause the processor to:
responsive to a receipt of a player tracking card by the player tracking card reader, communicate, via the first communication interface and to the server of the player tracking system, data associated with an identifier of a user read from the player tracking card, and
responsive to an occurrence of a point redemption event associated with the user and the user exclusively allocating a non-monetary loyalty point in an account maintained for that user by the server of the enterprise loyalty system to a first entity of a plurality of different entities affiliated with an enterprise:
communicate, via the second communication interface and to the server of the enterprise loyalty system, data associated with the occurrence of the point redemption event associated with the user and the user exclusively allocating the non-monetary loyalty point in the account maintained for that user to the first entity of the plurality of different entities affiliated with the enterprise, and
responsive to a receipt, via the second communication interface and from the server of the enterprise loyalty system, of data associated with a modification of a ranking of users associated with the first entity affiliated with the enterprise, cause a display device to display the modification of the ranking of users associated with the first entity affiliated with the enterprise, the modification being based on the allocation of the non-monetary loyalty point independent from any game being played at any electronic gaming machine,
wherein:
each enterprise is affiliated with a different plurality of entities,
each enterprise is distinct and independent from any electronic gaming machine and any game being played at any electronic gaming machine,
each enterprise is distinct and independent from any game being played at the electronic gaming machine,
each entity is distinct and independent from any electronic gaming machine and any game being played at any electronic gaming machine,
each entity is distinct and independent from any game being played at the electronic gaming machine,
after the non-monetary loyalty point is exclusively allocated to the first entity of the plurality of different entities affiliated with the enterprise, that non-monetary loyalty point remains in non-monetary loyalty point form in the account maintained for that user, and
when: (i) the non-monetary loyalty point is exclusively allocated to the first entity prior to any realized benefit event occurring in association with the non-monetary loyalty point, (ii) another non-monetary loyalty point in the account maintained for that user is exclusively allocated to a second, different entity of the plurality of different entities prior to any realized benefit event occurring in association with the other non-monetary loyalty point, and (iii) a realized benefit event occurs in association with the non-monetary loyalty point exclusively allocated to the first entity, then no benefit is realized in association with the other non-monetary loyalty point exclusively allocated to the second, different entity.

8. The player tracking unit of claim 7, wherein the point redemption event occurs responsive to receipt of data associated with an input made by the user.

9. The player tracking unit of claim 7, wherein when executed by the processor responsive to the occurrence of the point redemption event, prior to enabling the user to exclusively allocate the non-monetary loyalty point and responsive to a receipt, via the second communication interface, of leaderboard data from the server of the enterprise loyalty system, the instructions cause the processor to cause the display device to display a leaderboard maintained in association with the first entity.

10. The player tracking unit of claim 7, wherein when executed by the processor responsive to a receipt, via the second communication interface, of acknowledgement data from the server of the enterprise loyalty system, the instructions cause the processor to cause the display device to display an acknowledgement, from the first entity, of the allocated non-monetary loyalty point.

11. The player tracking unit of claim 7, wherein when executed by the processor responsive to a receipt, via the second communication interface, of advertisement data from the server of the enterprise loyalty system, the instructions cause the processor to cause the display device to display an advertisement based on the allocation of the non-monetary loyalty point to the first entity.

12. The player tracking unit of claim 7, wherein after the non-monetary loyalty point is exclusively allocated to the first entity, the non-monetary loyalty point is non-transferable to any other entity of the plurality of different entities.

13. The player tracking unit of claim 7, wherein when executed by the processor responsive to an occurrence of a point expiration event and a receipt, via the second communication interface, of data from the server of the enterprise loyalty system, the instructions cause the processor to cause the display device to display an unallocation of the non-monetary loyalty point from the first entity.

14. The player tracking unit of claim 7, wherein when executed by the processor prior to the occurrence of the point redemption event and responsive to a receipt, via the second communication interface and from the server of the enterprise loyalty system, of data associated with an occurrence of a point accumulation event associated with the user, the instructions cause the processor to cause the display device to display a notification of an accumulation of a quantity of non-monetary loyalty points for the user, wherein when accumulated, the quantity of non-monetary loyalty points are not allocated to any of the entities affiliated with the enterprise.

15. The player tracking unit of claim 14, wherein when executed by the processor after the occurrence of the point redemption event and responsive to a receipt, via the second communication interface and from the server of the enterprise loyalty system, of data associated with an occurrence of a realized benefit event associated with the first entity, the instructions cause the processor to cause the display device to display a benefit associated with the user.

16. A player tracking unit comprising:
a player tracking card reader;
a first communication interface operable to communicate with a server of a player tracking system;
a second communication interface operable to communicate with a server of an enterprise loyalty system operating distinct and independent from any game being played at any electronic gaming machine;
a third communication interface operable to serially communicate, in accordance with a slot accounting system protocol, with a master gaming controller of an electronic gaming machine;
a processor, and
a memory device that stores a plurality of instructions that, when executed by the processor, cause the processor to:

responsive to a receipt of a player tracking card by the player tracking card reader, communicate, via the first communication interface and to the server of the player tracking system, data associated with an identifier of a user read from the player tracking card, responsive to a receipt, via the second communication interface, of leaderboard data from the server of the enterprise loyalty system and for each of a plurality of different entities affiliated with an enterprise, cause a display device to display a leaderboard of a plurality of users associated with that entity, wherein:
- each enterprise is affiliated with a different plurality of entities,
- each enterprise is distinct and independent from any electronic gaming machine and any game being played at any electronic gaming machine,
- each of the plurality of different entities are distinct and independent from any electronic gaming machine and any game being played at any electronic gaming machine,
- the leaderboard for that entity is modifiable based on an exclusive allocation of at least one non-monetary loyalty point to that entity, the exclusive allocation occurring independent from any game being played at any electronic gaming machine, and
- for a first entity of the plurality of different entities:
  - the plurality of users are ranked based on an amount of non-monetary loyalty points each of the users exclusively allocated to that first entity, and
  - a non-monetary loyalty point maintained in an account of any of the plurality of users that is exclusively allocated to that first entity remains in non-monetary loyalty point form in the account of that user, and responsive to a receipt, via the second communication interface and from the server of the enterprise loyalty system, of data associated with a realized benefit event occurring in association with the first entity of the plurality of different entities, for a first user of the plurality of users with a first quantity of at least one non-monetary loyalty point in the account of that user previously allocated to the first entity prior to the realized benefit event occurring and with a second quantity of at least one non-monetary loyalty point in the account of that user previously allocated, prior to the realized benefit event occurring, to a second entity of the plurality of different entities, cause the display device to display a benefit associated with the first entity without displaying any benefit in association with the second quantity of at least one non-monetary loyalty point in the account that is exclusively allocated to the second entity.

17. The player tracking unit of claim 16, wherein the benefit comprises access to non-public information.

18. The player tracking unit of claim 16, wherein the benefit comprises access to a non-public area associated with the first entity.

19. The player tracking unit of claim 16, wherein when executed by the processor responsive to a receipt, via the second communication interface and from the server of the enterprise loyalty system, of data associated with the realized benefit event occurring in association with the first entity, for a second user of the plurality of users associated with the first entity, the instructions cause the processor to cause the display device to display a benefit associated with the second user, the second user having a lower ranking than the first user and the benefit associated with the second user having a lower value than the benefit associated with the first user.

* * * * *